US011693086B2

(12) United States Patent
Weber et al.

(10) Patent No.: US 11,693,086 B2
(45) Date of Patent: Jul. 4, 2023

(54) SMART DEVICE WITH AN INTEGRATED RADAR SYSTEM

(71) Applicant: Google LLC, Mountain View, CA (US)

(72) Inventors: David J. Weber, San Carlos, CA (US); Maryam Tabesh, San Francisco, CA (US); Jian Wang, Cupertino, CA (US); Camille Ann Lesko, Los Gatos, CA (US); Alexis K. Salazar, Morgan Hill, CA (US); Abhijit Aroon Shah, Foster City, CA (US)

(73) Assignee: Google LLC, Mountain View, CA (US)

( * ) Notice: Subject to any disclaimer, the term of this patent is extended or adjusted under 35 U.S.C. 154(b) by 979 days.

(21) Appl. No.: 16/457,914

(22) Filed: Jun. 28, 2019

(65) Prior Publication Data
US 2020/0408876 A1  Dec. 31, 2020

(51) Int. Cl.
*G01S 7/03* (2006.01)
*H02J 50/10* (2016.01)
(Continued)

(52) U.S. Cl.
CPC ............... *G01S 7/03* (2013.01); *G01S 7/352* (2013.01); *G01S 7/415* (2013.01); *G01S 13/867* (2013.01);
(Continued)

(58) Field of Classification Search
CPC .......... G01S 13/88; G01S 13/04; G01S 7/032; G01S 7/027; G01S 13/62; G01S 7/03;
(Continued)

(56) References Cited

U.S. PATENT DOCUMENTS

| 2008/0169970 A1* | 7/2008 | Woodcox .............. G01S 13/589 342/113 |
| 2013/0069816 A1* | 3/2013 | Ash, Jr. ................ H04B 1/3888 455/575.8 |

(Continued)

FOREIGN PATENT DOCUMENTS

| EP | 3370161 A1 * | 9/2018 | ........... G06F 17/141 |
| TW | I481892 | 4/2015 | |

OTHER PUBLICATIONS

"International Preliminary Report on Patentability", Application No. PCT/US2020/019115, dated Dec. 28, 2021, 8 pages.
(Continued)

*Primary Examiner* — Olumide Ajibade Akonai
(74) *Attorney, Agent, or Firm* — Colby Nipper PLLC

(57) ABSTRACT

Techniques and apparatuses are described that implement a smart device with an integrated radar system. The radar integrated circuit is positioned towards an upper-middle portion of a smart device to facilitate gesture recognition and reduce a false-alarm rate associated with other non-gesture related motions of a user. The radar integrated circuit is also positioned away from Global Navigation Satellite System (GNSS) antennas and a wireless charging receiver coil to reduce interference. The radar system operates in a low-power mode to reduce power consumption and facilitate mobile operation of the smart device. By limiting a footprint and power consumption of the radar system, the smart device can include other desirable features in a space-limited package (e.g., a camera, a fingerprint sensor, a display, and so forth).

20 Claims, 15 Drawing Sheets

(51) Int. Cl.
　　*H02J 50/70*　　　(2016.01)
　　*G01S 7/35*　　　(2006.01)
　　*G01S 7/41*　　　(2006.01)
　　*G01S 13/86*　　　(2006.01)
　　*G01S 19/13*　　　(2010.01)
　　*H02J 7/02*　　　(2016.01)
　　*H04M 1/02*　　　(2006.01)
　　*H04R 1/02*　　　(2006.01)

(52) U.S. Cl.
　　CPC .............. *G01S 19/13* (2013.01); *H02J 7/02* (2013.01); *H02J 50/10* (2016.02); *H02J 50/70* (2016.02); *H04M 1/0202* (2013.01); *H04R 1/028* (2013.01); *H04R 2499/11* (2013.01)

(58) Field of Classification Search
　　CPC ............ G01S 7/415; G01S 2013/9316; G01S 13/582; G01S 13/584; G01S 13/867; G01S 7/352; G06F 3/017; G06F 13/1668; G06F 2115/02; G06F 9/544; G06F 13/28
　　See application file for complete search history.

(56) References Cited

U.S. PATENT DOCUMENTS

| | | | |
|---|---|---|---|
| 2014/0199950 A1* | 7/2014 | Ash, Jr. .................. | H01Q 1/521 455/571 |
| 2017/0139036 A1* | 5/2017 | Nayyar .................. | G01S 7/352 |
| 2017/0168555 A1* | 6/2017 | Munoz .................. | G06F 1/3265 |
| 2017/0336497 A1 | 11/2017 | Jungmaier | |
| 2018/0196501 A1* | 7/2018 | Trotta .................... | G06F 3/017 |
| 2018/0329050 A1 | 11/2018 | Amihood et al. | |
| 2019/0045169 A1* | 2/2019 | Menashe .............. | H04N 13/128 |
| 2019/0086971 A1 | 3/2019 | Sanders et al. | |
| 2019/0216393 A1* | 7/2019 | Baheti ................. | H01L 23/5383 |
| 2019/0219687 A1* | 7/2019 | Baheti .................. | A61B 5/0022 |
| 2020/0026360 A1* | 1/2020 | Baheti .................... | G01S 13/06 |
| 2020/0026361 A1* | 1/2020 | Baheti .................... | G01S 13/87 |
| 2020/0064445 A1* | 2/2020 | Amihood ............. | G06F 1/3275 |
| 2020/0125158 A1* | 4/2020 | Giusti .................... | G06F 3/011 |
| 2020/0295972 A1* | 9/2020 | Hemo .................. | H04B 17/102 |
| 2020/0379827 A1* | 12/2020 | Singh .................. | B60W 50/04 |

OTHER PUBLICATIONS

International Search Report and Written Opinion, Application No. PCT/US2020/019115, dated May 28, 2020, 13 pages.

"Foreign Office Action", TW Application No. 109112176, dated Feb. 26, 2021, 11 pages.

"Extended European Search Report", EP Application No. 20169001.3, dated Sep. 17, 2020, 8 pages.

"Foreign Office Action", EP Application No. 20169001.3, dated Dec. 22, 2022, 7 pages.

\* cited by examiner

SMART DEVICE WITH AN INTEGRATED RADAR SYSTEM

BACKGROUND

Radars are useful devices that can detect and track objects. Relative to other types of sensors, like a camera, a radar can provide improved performance in the presence of different environmental conditions, such as low lighting and fog, or with moving or overlapping objects. Radar can also detect objections through one or more occlusions, such as a purse or a pocket. While it may be advantageous to use radar, there are many challenges associated with integrating radar into consumer devices. These challenges include size and layout constraints of the consumer device, limited available power during mobile operations, interference generated by other components, and mechanical vibrations, which can limit a design or operation of the radar.

SUMMARY

Techniques and apparatuses are described that implement a smart device with an integrated radar system. A design and position of the radar system within the smart device enables the radar system to satisfy space and layout constraints of the smart device, mitigate interference between itself and other components, and operate within power constraints of the smart device. In particular, a radar system includes a radar integrated circuit with at least one transmit antenna and at least one receive antenna. The radar integrated circuit is positioned towards an upper-middle portion of a smart device to facilitate gesture recognition and reduce a false-alarm rate associated with other non-gesture related motions of a user. The radar integrated circuit is also positioned away from Global Navigation Satellite System (GNSS) antennas to reduce interference at a GNSS receiver and away from a wireless charging receiver coil to reduce noise that affects the accuracy and sensitivity of the radar system.

A size of the radar integrated circuit enables the radar integrated circuit to fit between components that are themselves disposed between a display element of the smart device and an exterior housing of the smart device. In some cases, the radar integrated circuit is mechanically isolated from one or more of these other components, such as a speaker, to reduce the impact of mechanical vibrations. The radar system can also operate in a low-power mode to reduce power consumption and facilitate mobile operation of the smart device. By limiting a footprint and power consumption of the radar system, the smart device can include other desirable features in a space-limited package (e.g., a camera, a fingerprint sensor, a display, and so forth).

Aspects described below include a smart device with an integrated radar system. The smart device is shaped as a rectangular prism. The rectangular prism has a length, width, and height. The height is greater than the length and width. The length is greater than the width. The length and height form a rectangular plane on a first exterior plane of the smart device coexisting with a viewing plane of the smart device. The first exterior plane has a top edge, a bottom edge opposite the top edge, a left edge, and a right edge opposite the left edge. A center plane centered between the left edge and the right edge bifurcates the first exterior plane. The center plane is perpendicular to the top edge and the bottom edge. The smart device is configured to operate in a portrait orientation in which the top and bottom edges are substantially parallel to a ground plane. The smart device comprises a radar system positioned inside the rectangular prism. The radar system comprises a radar integrated circuit with at least one transmit antenna, at least one receive antenna, and a center. The center of the radar integrated circuit located closer to the center plane than the left edge or the right edge. The center of the radar integrated circuit located closer to the top edge than the bottom edge.

Aspects described below include a smart device with an integrated radar system. The smart device is shaped as a rectangular prism. The rectangular prism has a length, width, and height. The height is larger than the length and width. The length is greater than the width. The length and height form a rectangular plane on a first exterior plane of the smart device coexisting with a viewing plane of the smart device. The first exterior plane has a top edge, a bottom edge opposite the top edge, a left edge, and a right edge opposite the left edge. The viewing plane has an upper portion that is proximate to the top edge and a lower portion that is proximate to the bottom edge. The upper portion and the lower portion are separated by a sensor plane that is perpendicular to the left edge and the right edge. The smart device configured to operate in a portrait orientation in which the top and bottom edges are substantially parallel to a ground plane. The smart device comprises a display element positioned inside the rectangular prism beneath the lower portion of the viewing plane. The smart device also comprises a radar system positioned inside the rectangular prism beneath. The radar system comprises a radar integrated circuit with at least one transmit antenna positioned beneath the upper portion of the viewing plane and at least one receive antenna; positioned beneath the upper portion of the viewing plane.

BRIEF DESCRIPTION OF THE DRAWINGS

Apparatuses for and techniques implementing a smart device with an integrated radar system are described with reference to the following drawings. The same numbers are used throughout the drawings to reference like features and components:

FIGS. 7-1 illustrates an example position of a radar integrated circuit relative to components within a main logic board of a smartphone.

FIG. 7-2 illustrates an example position of a radar integrated circuit relative to other components within a main logic board of a smartphone.

FIG. 12-1 illustrates another example position of a radar integrated circuit relative to components within a main logic board of a smartphone.

FIG. 12-2 illustrates another example position of a radar integrated circuit relative to other components within a main logic board of a smartphone.

DETAILED DESCRIPTION

Overview

While it may be advantageous to use radar, there are many challenges associated with integrating a radar into consumer devices. One such problem involves restrictions that a smaller consumer device may place on a radar's design. Size or layout constraints, for example, can limit a quantity of antennas and impact spacings between the antennas. Another problem is the interference generated between another component operating within the consumer device and the radar. This interference reduces sensitivity and accuracy of the radar or of the other component. Available power may also be limited due to mobile operation of the consumer device.

This document describes techniques that implement a smart device with an integrated radar system. A design and position of the radar system within the smart device enables the radar system to satisfy space and layout constraints of the smart device, mitigate interference between itself and other components, and operate within power constraints of the smart device. In particular, a radar system includes a radar integrated circuit with at least one transmit antenna and at least one receive antenna. The radar integrated circuit is positioned towards an upper-middle portion of a smart device to facilitate gesture recognition and reduce a false-alarm rate associated with other non-gesture related motions of a user. The radar integrated circuit is also positioned away from Global Navigation Satellite System (GNSS) antennas to reduce interference at a GNSS receiver and away from a wireless charging receiver coil to reduce noise, which affects the accuracy and sensitivity of the radar system.

A size of the radar integrated circuit enables the radar integrated circuit to fit between components that exist between a display element of the smart device and an exterior housing of the smart device. In some cases, the radar integrated circuit is mechanically isolated from one or more of these other components, such as a speaker, to reduce the impact of mechanical vibrations. The radar system can also operate in a low-power mode to reduce power consumption and facilitate mobile operation of the smart device. By limiting a footprint and power consumption of the radar system, the smart device can include other desirable features in a space-limited package (e.g., a camera, a fingerprint sensor, a display, and so forth).

Example Environment

Figure 1:
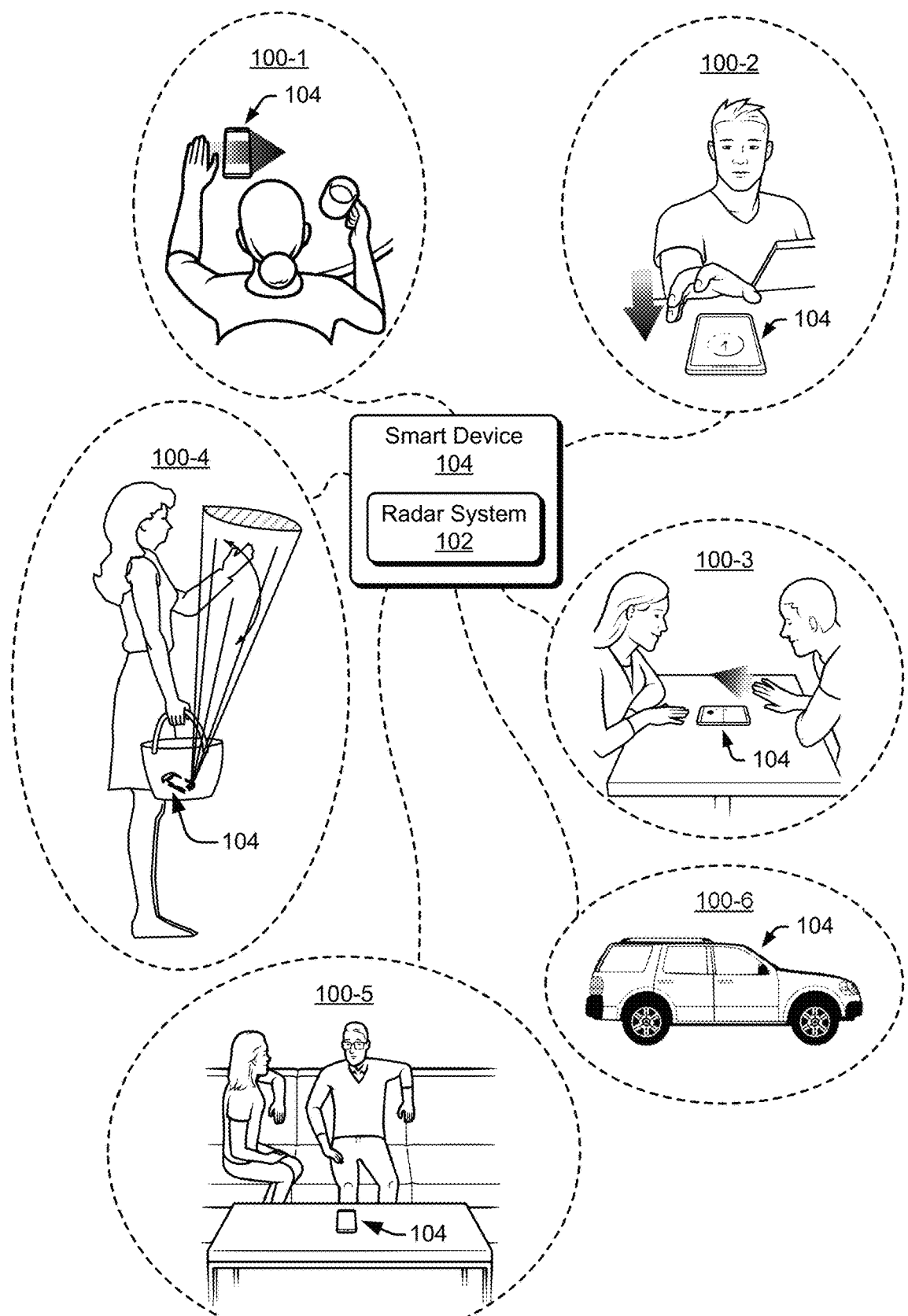
FIG. 1 illustrates example environments in which a smart-device with an integrated radar system can operate.

FIG. 1 is an illustration of example environments 100-1 to 100-6 in which an integrated radar system 102 of a smart device 104 can operate. In the depicted environments 100-1 to 100-6, the radar system 102 is capable of proximity detection, gesture recognition, user authentication, human vital-sign detection, collision avoidance, autonomous driving, and so forth. The smart device 104 is shown to be a smartphone in environments 100-1 to 100-5 and a steering wheel in the environment 100-6.

In the environments 100-1 to 100-4, a user performs different types of gestures, which are detected by the radar system 102. For example, the user in environment 100-1 makes a scrolling gesture by moving a hand above the smart device 104 along a horizontal dimension (e.g., from a left side of the smart device 104 to a right side of the smart device 104). In the environment 100-2, the user makes a reaching gesture, which decreases a distance between the smart device 104 and the user's hand. The users in environment 100-3 make hand gestures to play a game on the smart device 104. In one instance, a user makes a pushing gesture by moving a hand above the smart device 104 along a vertical dimension (e.g., from a bottom side of the smart device 104 to a top side of the smart device 104). In the environment 100-4, the smart device 104 is stored within a purse and the radar system 102 provides occluded-gesture recognition by detecting gestures that are occluded by the purse.

The radar system 102 can also recognize other types of gestures or motions not illustrated in FIG. 1. Example types of gestures include, a knob-turning gesture in which a user curls their fingers to grip an imaginary doorknob and rotate their fingers and hand in a clockwise or counter-clockwise fashion to mimic an action of turning the imaginary doorknob. Another example type of gesture includes a spindle-twisting gesture, which a user performs by rubbing a thumb and at least one other finger together. The gestures can be two-dimensional, such as those usable with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the smart device 104 can perform an action, such as display new content, move a cursor, activate one or more sensors, open an application, and so forth. In this way, the radar system 102 provides touch-free control of the smart device 104.

In the environment 100-5, the radar system 102 generates a three-dimensional map of a surrounding environment for contextual awareness. The radar system 102 also detects and tracks multiple users to enable the multiple users to interact with the smart device 104. The radar system 102 can also perform human vital-sign detection. In the environment 100-6, the radar system 102 monitors vital signs of a user that drives a vehicle. Example vital signs include a heart rate and a respiration rate. If the radar system 102 determines that the driver is falling asleep, for instance, the radar system 102 can cause the smart device 104 to alert the user. Alternatively, if the radar system 102 detects a life-threatening emergency, such as a heart attack, the radar system 102 can cause the smart device 104 to alert a medical professional or emergency services. Components of the smart device and the radar system 102 are further described with respect to FIGS. 2 and 3, respectively.

Figure 2:
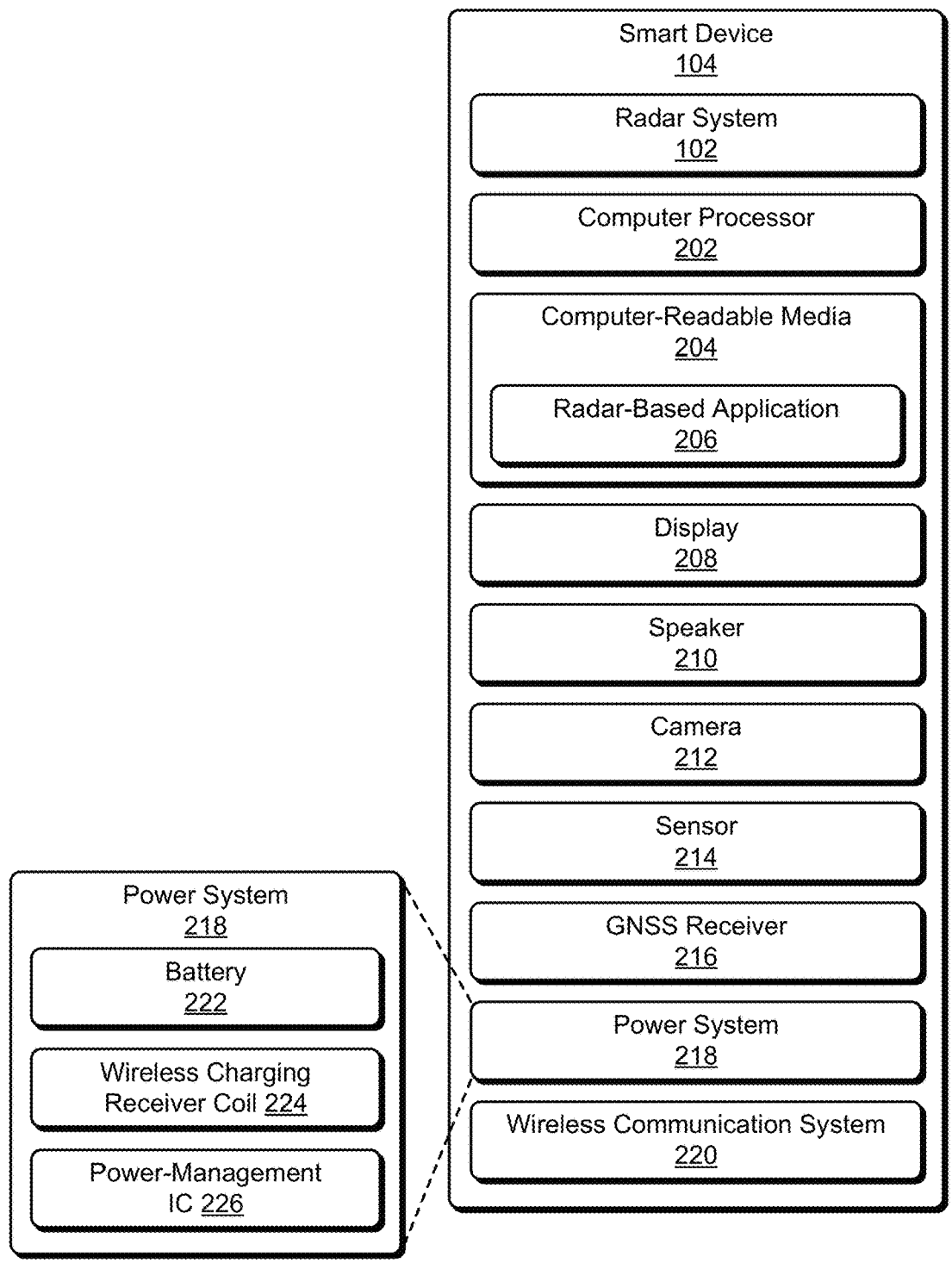
FIG. 2 illustrates an example device diagram of a smart device with an integrated radar system.

FIG. 2 illustrates an example device diagram 200 of the smart device 104. Considering an example in which the smart device 104 is a smartphone, the smart device 104 includes the radar system 102, at least one computer processor 202, and computer-readable media (CRM) 204. The computer-readable media 204 includes memory media and storage media. Applications and/or an operating system (not illustrated) embodied as computer-readable instructions on the computer-readable media 204 can be executed by the computer processor 202. The computer-readable media 204 also includes a radar-based application 206, which uses radar data generated by the radar system 102 to perform a function, such as presence detection, gesture-based touch-free control, collision avoidance for autonomous driving, human vital-sign notification, and so forth.

The smart device 104 of FIG. 2 also includes at least one display 208, at least one speaker 210, at least one camera 212, and one or more sensors 214. Example types of sensors 214 include infrared (IR) sensors for facial recognition, a proximity sensor, an ambient light sensor, an accelerometer, a gyroscope, a magnetometer, a barometer, and so forth. Size and locations of some of these components can affect a design and placement of components within the radar system 102, as further described with respect to FIGS. 4-13.

The smart device 104 further includes a Global Navigation Satellite System (GNSS) receiver 216 (e.g., a global positioning system (GPS) receiver), a power system 218, and a wireless communication system 220. The GNSS receiver 216 enables the smart device 104 to determine its location. In some implementations, operation of the radar system 102 interferes with the GNSS receiver 216's ability to determine an accurate location. As such, increasing a distance between antennas of the radar system 102 and antennas of the GNSS receiver 216 is desirable to reduce this interference, as further described with respect to FIGS. 7 and 12.

An example power system 218 includes a battery 222, a wireless charging receiver coil 224, a charging cable (not illustrated), and one or more power-management integrated circuits (PMICs) 226. During mobile operation, the available power is limited by a capacity of the battery 222, which can be between approximately 1000 and 5000 milliamp hours (mAh), for instance. This limited capacity affects a design and operational configuration of the radar system 102 to enable the smart device 104 to be used for a particular amount of time in the mobile configuration. As such, the radar system 102 can operate with lower duty cycles to reduce power consumption, as further described with respect to FIG. 5.

During wireless charging, a frequency used to transfer power to a wireless charging receiver via the wireless charging receiver coil 224 can interfere with the operation of the radar system 102. As such, increasing a distance between the radar system 102 and the wireless charging receiver coil 224 is desirable to reduce this interference, as further described with respect to FIGS. 6 and 11.

The wireless communication system 220 enables the smart device 104 to communicate with another entity via a wireless link. The wireless link may be implemented using any suitable communication protocol or standard, such as second-generation (2G), third-generation (3G), fourth-generation (4G), or fifth-generation (5G) cellular; IEEE 802.11 (e.g., WiFi™); IEEE 802.15 (e.g., Bluetooth™); IEEE 802.16 (e.g., WiMAX™); and so forth. The wireless communication system 220 communicates data over a local-area-network (LAN), a wireless local-area-network (WLAN), a personal-area-network (PAN), a wire-area-network (WAN), an intranet, the Internet, a peer-to-peer network, point-to-point network, a mesh network, and the like.

Figure 3:
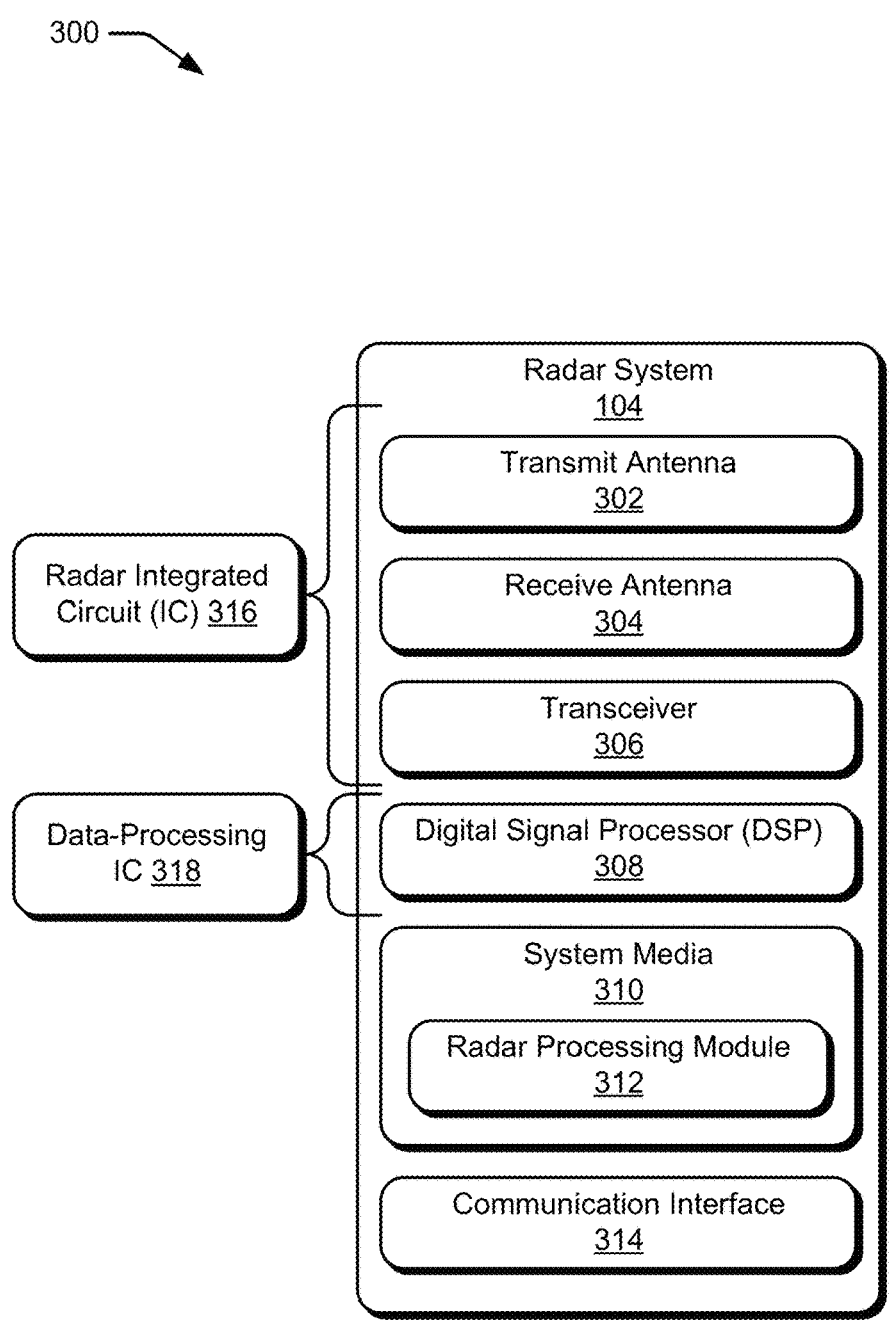
FIG. 3 illustrates an example device diagram of a radar system integrated within a smart device.

FIG. 3 illustrates an example device diagram 300 of the radar system 102. The radar system 102 includes at least one transmit antenna 302 and at least one receive antenna 304. In some situations, the radar system 102 includes multiple transmit antennas 302 to implement a multiple-input multiple-output (MIMO) radar capable of transmitting multiple distinct waveforms at a given time (e.g., a different waveform per transmit antenna). The transmit antenna 302 and the receive antennas 304 can be circularly polarized, horizontally polarized, vertically polarized, or a combination thereof.

In some implementations, the radar system 102 includes multiple receive antennas 304 positioned in a one-dimensional shape (e.g., a line) or a two-dimensional shape (e.g., a rectangular arrangement, a triangular arrangement, an "L" shape arrangement) for implementations that include three or more receive antennas. The one-dimensional shape enables the radar system 102 to measure one angular dimension (e.g., an azimuth, an elevation) while the two-dimensional shape enables the radar system 102 to measure two angular dimensions (e.g., to determine both an azimuth angle and an elevation angle of the object). A spacing between the receive antennas 304 can be less than, greater than, or equal to half a wavelength of a radar signal that is transmitted by the radar system 102.

In general, the radar system 102 can form beams that are steered or un-steered, wide or narrow, or shaped (e.g., hemisphere, cube, fan, cone, cylinder). The steering and shaping can be achieved through analog or digital beamforming. In an example implementation, the one or more transmit antennas 302 have an un-steered omnidirectional radiation pattern or produce a wide steerable beam to illuminate a large volume of space. To achieve target angular accuracies and angular resolutions, digital beamforming is used to generate hundreds or thousands of narrow steered beams using the receive antennas 304. In this way, the radar system 102 can efficiently monitor an external environment and detect one or more users or other objects.

The radar system 102 also includes at least one transceiver 306, at least one digital signal processor (DSP) 308, and system media 310 (e.g., one or more computer-readable storage media). The transceiver 306 includes circuitry and logic for transmitting radar signals via the transmit antenna 302 and receiving reflected radar signals via the receive antennas 304. Components of the transceiver 306 include amplifiers, mixers, switches, analog-to-digital converters, and filters for conditioning the radar signals. The transceiver 306 also includes logic to perform in-phase/quadrature (I/Q) operations, such as modulation or demodulation. A variety of modulations can be used, including linear frequency modulations, triangular frequency modulations, stepped frequency modulations, or phase modulations. Alternatively, the transceiver 306 produces radar signals having a relatively constant frequency or a single tone. The transceiver 306 can support continuous-wave or pulsed radar operations.

A frequency spectrum (e.g., range of frequencies) that the transceiver 306 can use to generate the radar signals can encompass frequencies between 1 and 400 gigahertz (GHz), between 4 and 100 GHz, between 1 and 24 GHz, between 2 and 4 GHz, between 57 and 64 GHz, or at approximately 2.4 GHz. In some cases, the frequency spectrum can be divided into multiple sub-spectrums that have a similar or different bandwidths. The bandwidths can be on the order of 500 megahertz (MHz), 1 GHz, 2 GHz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 306 to generate multiple radar signals, which are transmitted simultaneously or separated in time. In some situations, multiple contiguous frequency sub-spectrums may be used to transmit a single radar signal, thereby enabling the radar signal to have a wide bandwidth.

Although the digital signal processor 308 is shown to be separate from the transceiver 306 in FIG. 3, the digital signal processor 308 can alternatively be implemented within the transceiver 306. The digital signal processor 308 executes computer-readable instructions that are stored within the system media 310. Example digital operations performed by the digital signal processor 308 include Fast-Fourier Transforms (FFTs), filtering, modulations or demodulations, digital signal generation, digital beamforming, and so forth.

The system media 310 includes a radar processing module 312, which processes digital intermediate-frequency beat signals provided by the transceiver 306 for gesture recognition, proximity detection, human vital-sign detection, collision avoidance, autonomous driving, and so forth. In some implementations, the radar processing module 312 uses machine learning to analyze the signals provided by the transceiver 306.

The radar system 102 includes a communication interface 314 to pass information from the digital signal processor 308 to the computer processor 202 of the smart device 104. For example, the radar system 102 uses the communication interface 314 to indicate to the radar-based application 206 that a user performed a particular gesture, such as a left-swipe gesture or a right-swipe gesture.

In general, the radar system 102 is designed to consume a low amount of power relative to other types of sensors such as the camera 212. As an example, the radar system 102 uses approximately 110 milliwatts (mW) of power to operate with a 5% duty cycle whereas an example camera 212 consumes between approximately 150 and 400 mW of power. The radar system 102 is capable of operating with a variety of different duty cycles, which includes duty cycles between 0.1% and 10%. Operating at lower duty cycles enables the radar system 102 to conserve power. In some cases, the radar system 102 dynamically determines the duty cycle based on an amount of power that is available (e.g., whether the smart device 104 is connected to an external power source or is in a mobile configuration). Instead of operating at either a low-power mode or a high-power mode, the radar system 102 dynamically switches between different power modes such that response delay and power consumption are managed together based on the activity within the environment and the power limitations of the smart device 104.

In example implementations described in FIGS. 4-13, the transmit antenna 302, the receive antennas 304, and the transceiver 306 are integrated within a radar integrated circuit 316. Additionally, a separate data-processing integrated circuit 318 includes the digital signal processor 308. In some example implementations, the data-processing integrated circuit 318 can be implemented as a System-On-A-Chip (SOC). In some implementations, the data-processing integrated circuit 318 also processes audio data from a microphone to identify a verbal command from the user. In general, the data-processing integrated circuit 318 is designed to consume less power relative to the computer processor 202. The radar integrated circuit 316 and the data-processing integrated circuit 318 can be implemented on a same printed circuit board or different printed circuit boards.

Example implementations of the smart device 104 with the radar system 102 are further described with respect to FIGS. 4-13. FIGS. 4-8 are associated with a first smartphone while FIGS. 9-13 are associated with a second smartphone that has larger lateral dimensions relative to the first smartphone. Example dimensions and materials of these smartphones are described below. Unless otherwise specified, the dimensions include a tolerance of half a centimeter or less.

The below techniques for integrating the radar system 102 within the smartphones of FIGS. 4-13 can also be applied to other types of smartphones or smart devices that have other dimensions or use other types of material. Other types of smart devices 104 include a desktop computer, a tablet, a laptop, a television, a computing watch, computing glasses, a gaming system, a microwave, a vehicle, a home service device, a smart speaker, a smart thermostat, a security camera, a baby monitor, a WiFi™ router, a drone, a track pad, a drawing pad, a netbook, an e-reader, a home-automation and control system, a wall display, and another home appliance. The smart device 104 can be wearable, non-wearable but mobile, or relatively immobile (e.g., desktops and appliances). The radar system 102 can be used as a stand-alone radar system or used with, or embedded within, many different smart devices 104 or peripherals, such as in control panels that control home appliances and systems, in automobiles to control internal functions (e.g., volume, cruise control, or even driving of the car), or as an attachment to a laptop computer to control computing applications on the laptop.

Example Smart Device with an Integrated Radar System

Figure 4:
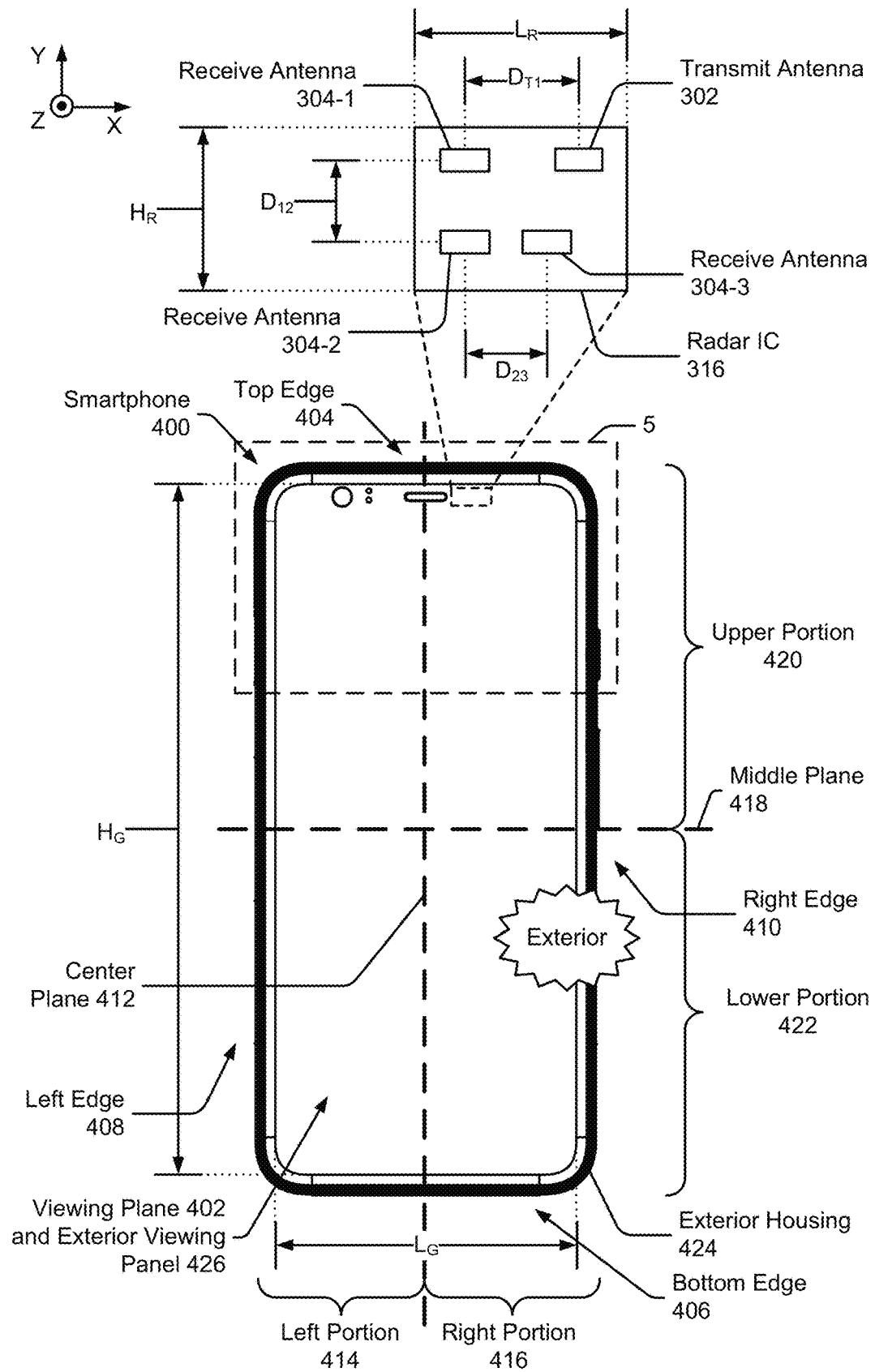
FIG. 4 illustrates an example implementation of a smartphone with an integrated radar system.

FIG. 4 illustrates an example implementation of a smartphone 400 with the integrated radar system 102. The smartphone 400 is shaped as a rectangular prism with a height that is greater than a length and width. Additionally, the length is greater than the width. The smartphone 400 is illustrated in the portrait orientation in which the height is along a vertical Y axis, the length is along a horizontal X axis, and the width is along a Z axis that is perpendicular to X and Y axes. The length and height form a rectangular plane on a first exterior plane of the smartphone 400. The first exterior plane coexists with a viewing plane 402 and has a top edge 404, a bottom edge 406 that is opposite to the top edge, a left edge 408, and a right edge 410 that is opposite the left edge 408.

A center plane 412 centered between the left edge 408 and the right edge 410 bifurcates the first exterior plane and is perpendicular to the top edge 404 and the bottom edge 406. The center plane 412 separates a left portion 414 of the smartphone 400, which is proximate to the left edge 408, from a right portion 416 of the smartphone 400, which is proximate to the right edge 410. A middle plane 418 centered between the top edge 404 and the bottom edge 406 bifurcates the first exterior plane and is perpendicular to the left edge 408 and the right edge 410. The middle plane 418 separates an upper portion 420 of the smartphone 400, which is proximate to the top edge 404, from a lower portion 422 of the smartphone 400, which is proximate to the bottom edge 406.

An exterior of the smartphone 400 includes an exterior housing 424 and an exterior viewing panel 426. The exterior housing 424 has a vertical height of approximately 147 millimeters (mm), a horizontal length of approximately 69 mm, and a width of approximately 8 mm. The exterior housing 424 can be composed of metal material, for instance.

The exterior viewing panel 426 forms an exterior face of the smartphone 400 (e.g., the viewing plane 402). The exterior viewing panel 426 has a vertical height ($H_G$) of approximately 139 mm and a horizontal length ($L_G$) of approximately 61 mm. The exterior viewing panel 426 includes cut-outs for various components that are positioned within an interior of the smartphone 400 (e.g., positioned beneath the exterior viewing panel 426). These components are further described with respect to FIG. 5.

The exterior viewing panel 426 can be formed using various types of glass or plastics that are found within display screens. In some implementations, the exterior viewing panel 426 has a dielectric constant (e.g., a relative permittivity) between approximately four and ten, which attenuates or distorts radar signals. As such, the exterior viewing panel 426 is opaque or semi-transparent to a radar signal and can cause a portion of a transmitted or received radar signal to be reflected.

The radar integrated circuit 316 is also positioned beneath the exterior viewing panel 426 and near the top edge 404 (e.g., within the upper portion 420 of the smartphone 400). The radar integrated circuit 316 has a vertical height ($H_R$) of approximately 5 mm, a horizontal length ($L_R$) of approximately 6.5 mm, and a thickness of approximately 0.85 mm (within +/−0.1 mm along each dimension). This limited footprint enables the radar integrated circuit 316 to fit between the speaker 210 and an infrared sensor 214-3 illustrated in FIG. 5. Additionally, the radar integrated circuit 316 fits between the exterior housing 424 and a display element 502 illustrated in FIG. 5. The vertical height of the radar integrated circuit 316 can be similar to the other components positioned near the top edge 404 to avoid reducing a size of the display element 502.

In this example implementation, the radar integrated circuit 316 includes one transmit antenna 302 and three receive antennas 304-1 to 304-3. The three receive antennas 304-1 to 304-3 are positioned in an L-arrangement, with a vertical distance between a center of the first receive antenna 304-1 and the second receive antenna 304-2 ($D_{12}$) being approximately 2.5 mm and a horizontal distance between a center of the second receive antenna 304-2 and a center of the third receive antenna 304-3 ($D_{23}$) being approximately 2.5 mm A distance between a center of the transmit antenna 302 and the center of the first receive antenna 304-1 ($D_{T1}$) is approximately 3.5 mm. In general, the transmit antenna 302 is offset relative to the third receive antenna 304-3 such that $D_{T1}$ is greater than $D_{23}$.

The transmit antenna 302 and the receive antennas 304-1 to 304-3 are oriented towards (e.g., face) the exterior viewing panel 426. As such, the radar integrated circuit 316 radiates through the exterior viewing panel 426 (e.g., transmits and receives the radar signals that propagate through the exterior viewing panel 426). If the exterior viewing panel 426 behaves as an attenuator, as described above, the radar system 102 can adjust a frequency or a steering angle of a transmitted radar signal to mitigate the effects of the attenuator instead of increasing transmit power. As such, the radar system 102 can realize enhanced accuracy and longer ranges for detecting and tracking the user without increasing power consumption.

In this example, the radar integrated circuit 316 transmits and receives radar signals with frequencies between approximately 57 and 64 GHz. This mitigates interference with the wireless communication system 220, which uses frequencies below 20 GHz, for instance. Transmitting and receiving radar signals with millimeter wavelengths further enables the radar integrated circuit 316 to realize the above footprint.

To facilitate gesture recognition, the radar integrated circuit 316 is positioned closer to the center plane 412 relative to the left edge 408 or the right edge 410. This improves visibility of the radar integrated circuit 316 for detecting gestures performed by the user. It also reduces a probability that the user accidentally interacts with the radar system 102 with non-gesture related motions, thereby reducing a false-alarm rate of the radar system 102. Furthermore, because the radar integrated circuit 316 is not visible to the user from behind the exterior viewing panel 426, the user is likely to perform gestures relative to the center plane 412. By positioning the radar integrated circuit 316 near the user's reference point, the radar system 102 is better positioned to distinguish between gestures associated with different directions (e.g., distinguish between a left swipe and a right swipe). There are several other advantages and trade-offs for positioning the radar integrated circuit 316 at the illustrated location, as further described below with respect to FIGS. 5-8.

Figure 5:
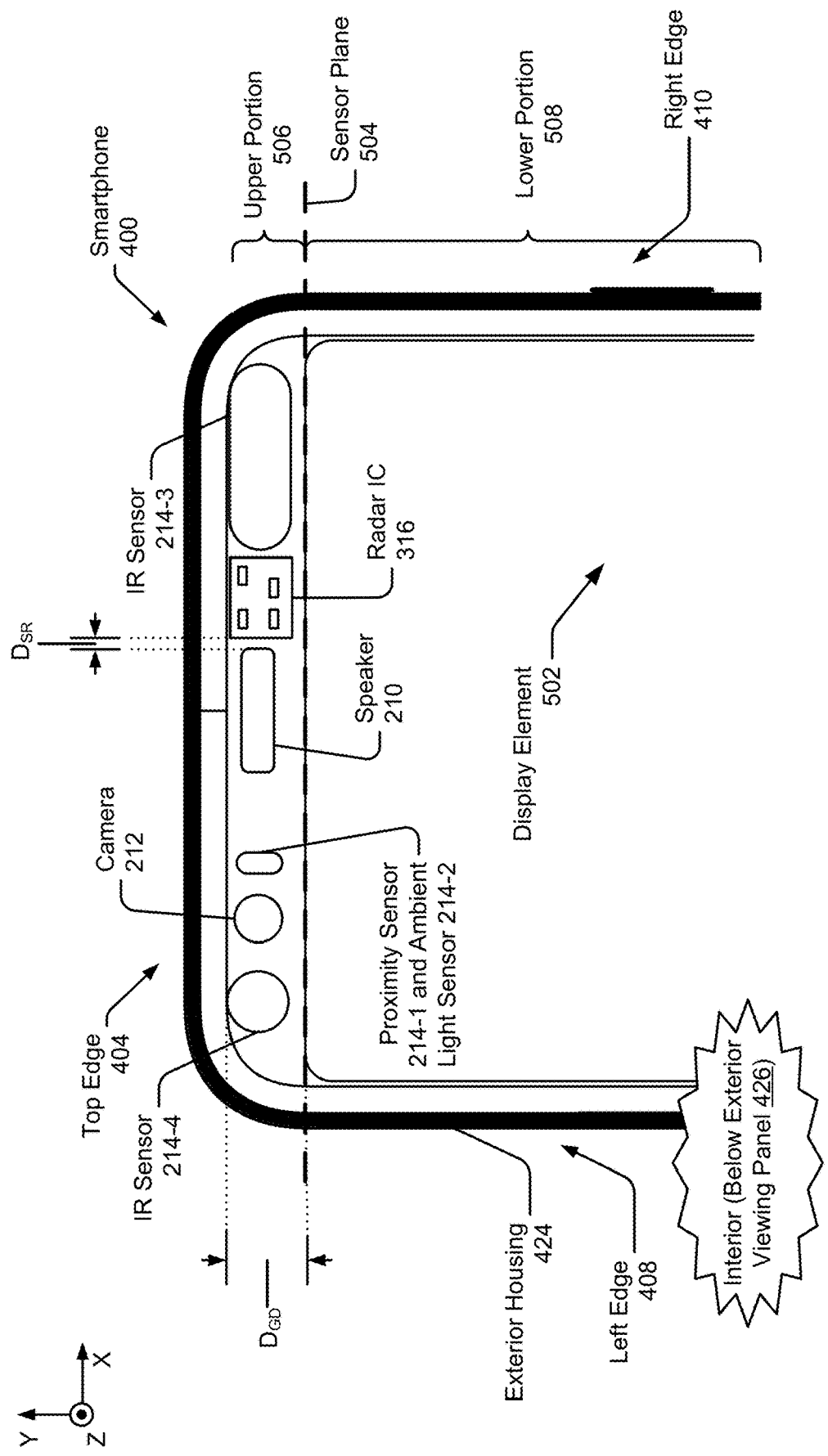
FIG. 5 illustrates an example position of a radar integrated circuit relative to other components within an upper portion of a smartphone.

FIG. 5 illustrates an example position of the radar integrated circuit 316 relative to other components within the upper portion 420 of the smartphone 400. A depicted interior of the smartphone 400 includes the radar integrated circuit 316, the speaker 210, the camera 212, a proximity sensor 214-1, an ambient light sensor 214-2, an infrared sensor 214-3, another infrared sensor 214-4, and a display element 502.

A sensor plane 504 intersects the exterior viewing panel 426 of FIG. 4 and is perpendicular to the left edge 408 and the right edge 410. The sensor plane 504 separates an upper portion 506 of the exterior viewing panel 426, which is proximate to the top edge 404, from a lower portion 508 of the exterior viewing panel 426, which is proximate to the bottom edge 406 of FIG. 4. The sensor plane 504 is parallel to the top edge 404 and is closer to the top edge 404 than the bottom edge 406. In this example, a distance between a top edge of the display element 502 and a top edge of the exterior viewing panel 426 ($D_{GD}$) is approximately 6.2 mm.

The radar integrated circuit 316, the speaker 210, the camera 212, the proximity sensor 214-1, the ambient light sensor 214-2 and the infrared sensor 214-3 are positioned beneath the upper portion 506 of the exterior viewing panel 426. The display element 502 is positioned beneath the lower portion 508 of the exterior viewing panel 426.

The infrared sensors 214-3 and 214-4 are used for facial recognition. To conserve power, the infrared sensors 214-3 and 214-4 operate in an off-state when not in use. However, a warm-up sequence associated with transitioning the infrared sensors 214-3 and 214-4 from the off-state to an on-state can require a significant amount of time, such as a half second or more. This can cause a delay in execution of the facial recognition. To reduce this time delay, the radar system 102 proactively detects the user reaching towards or approaching the smartphone 400 and initiates the warm-up sequence prior to the user touching the smartphone 400. As such, the infrared sensors 214-3 and 214-4 can be in the on-state sooner and reduce a time the user waits for the facial recognition to complete.

The display element 502 implements the display 208 of FIG. 2 and displays images that are viewed through the exterior viewing panel 426. As shown, the transmit antenna 302 and the receive antennas 304-1 to 304-3 of the radar integrated circuit 316 are oriented towards (e.g., face) a same direction as the display element 502 such that the radar integrated circuit 316 transmits radar signals towards a user that is looking at the display 208.

In this example, the radar integrated circuit 316 is positioned between the infrared sensor 214-3 and the speaker 210. One trade-off for placing the radar integrated circuit 316 near the center plane 412 is placing the radar integrated circuit 316 near the speaker 210. A distance between the radar integrated circuit 316 and the speaker 210 ($D_{SR}$) is approximately 0.93 mm or less, for instance. To reduce an impact of mechanical vibrations from the speaker 210, the radar integrated circuit 316 is mechanically isolated from the speaker 210. If the smartphone 400 includes another speaker within the lower portion 422 of the smartphone 400, a bass speaker can be integrated within the other speaker instead of the speaker 210 in order to place the bass speaker farther away from the radar integrated circuit 316.

Figure 6:
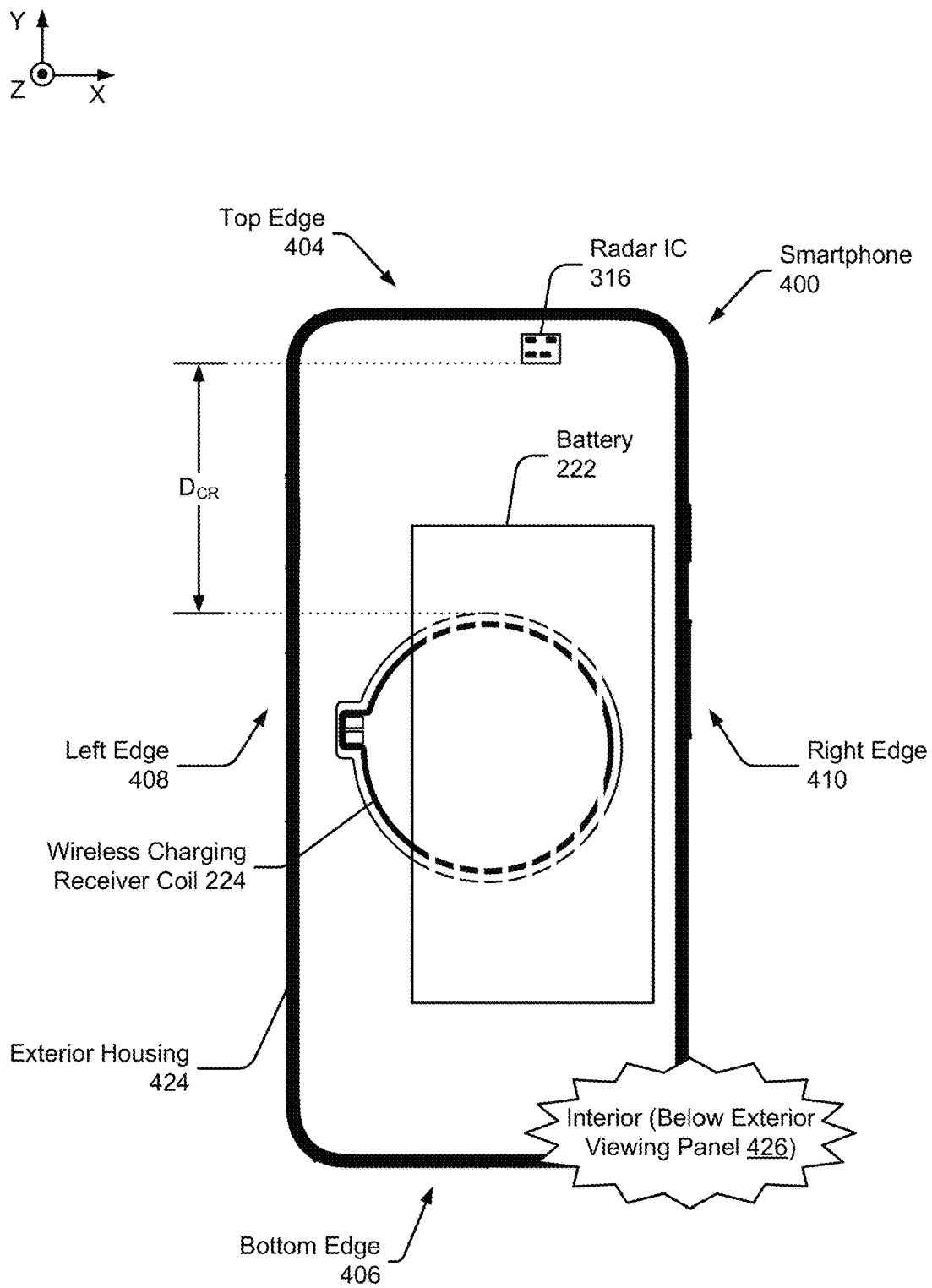
FIG. 6 illustrates an example position of a radar integrated circuit relative to components of a power system within a smartphone.

FIG. 6 illustrates an example position of the radar integrated circuit 316 relative to components of the power system 218 within the smartphone 400. In the depicted configuration, the power system 218 includes the battery 222 and the wireless charging receiver coil 224 of FIG. 2. The wireless charging receiver coil 224 is positioned below the battery 222 (e.g., the battery 222 is between the wireless charging receiver coil 224 and the exterior viewing panel 426 along the Z axis).

In some implementations, frequencies used to wirelessly transfer power for wireless charging are also used for radar operations. As an example, the radar integrated circuit 316 generates an intermediate-frequency beat signal with frequencies between approximately 30 and 500 kilohertz (kHz) and the frequency of a wireless charging signal is between approximately 110 and 150 kHz. To mitigate the interference generated during wireless charging, the radar integrated circuit 316 is positioned at a distance ($D_{CR}$) of at least 43 mm away from the wireless charging receiver coil 224. This reduces the AC coupling and interference experienced by the radar system 102, thereby improving the sensitivity and the accuracy of the radar system 102. In some implementations, a magnetic shield is placed between the wireless charging receiver coil 224 and the battery 222 (e.g., between the wireless charging receiver coil 224 and the radar integrated circuit 316). The magnetic shield is implemented as a nanocrystalline shield, for instance.

Figures 1, 7:
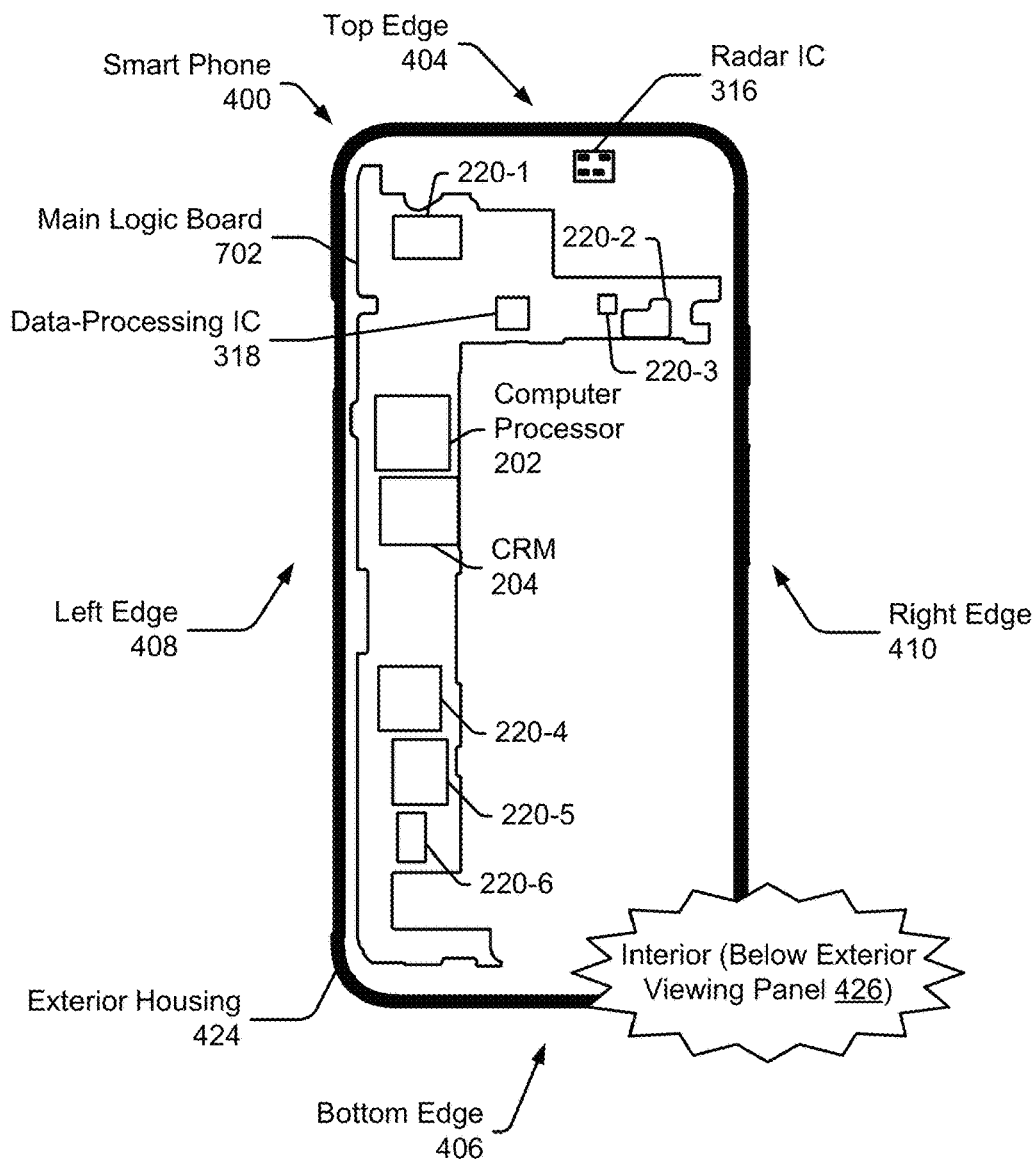
Figures 2, 7:
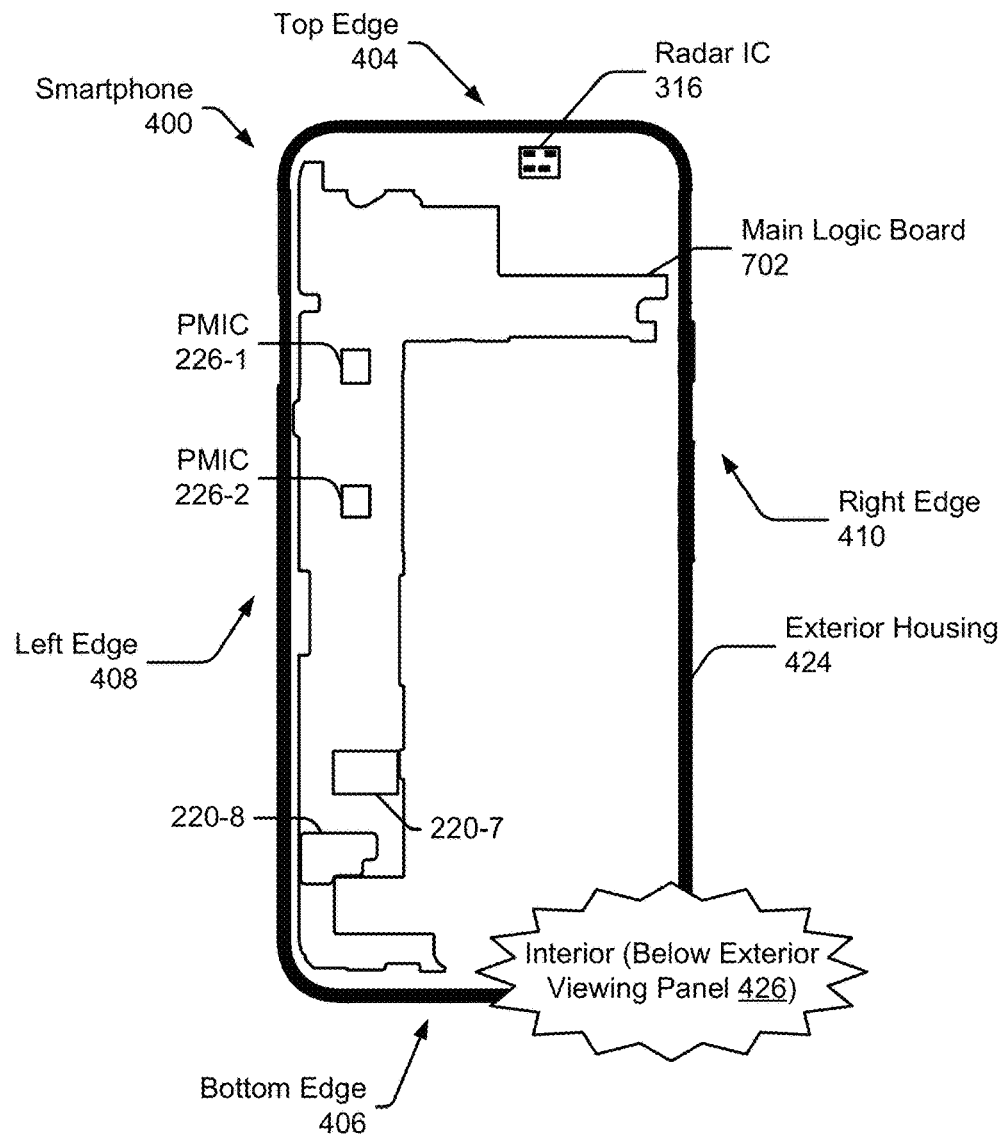

FIGS. 7-1 and 7-2 illustrate an example position of the radar integrated circuit 316 relative to components within a main logic board 702 of the smartphone 400. In the depicted configuration, components that are implemented on a top face of the main logic board 702 are illustrated in FIG. 7-1. These components are oriented towards or face the exterior viewing panel 426. Other components that are implemented on a bottom face of the main logic board 702 are illustrated in FIG. 7-2. These components are oriented away from the exterior viewing panel 426 and face a back side of the smartphone 400 that is opposite the exterior viewing panel 426. The main logic board 702 includes the computer processor 202, the computer-readable media 204, and the data-processing integrated circuit 318 of the radar system 102. The main logic board 702 also includes PMICs 226-1 and 226-2, which provide power to the radar integrated circuit 316 and the main logic board 702. The two-PMIC design can realize improvements in heat dissipation and efficiency relative to a single-PMIC design.

The main logic board 702 additionally includes modules 220-1 to 220-8 of the wireless communication system 220. These modules include a WiFi™ and Bluetooth™ transceiver module 220-1, cellular transceiver modules 220-2, 220-7, and 220-8, a near-field communication (NFC) module 220-3, plain-text receive (PTRX) modules 220-5 and 220-6, and other types of components not shown, such as power amplifier modules. In this example, the GNSS receiver 216 is also implemented within the WiFi™ and Bluetooth™ transceiver module 220-1. The cellular transceiver modules 220-2, 220-7, and 220-8 and the plain-text receive modules 220-4 and 220-6 are associated with a low band, a mid-high band, a high band, or an ultra-high band, or combinations thereof.

The data-processing integrated circuit 318 is positioned within the upper portion 420 to facilitate communication with the radar integrated circuit 316, which is implemented on a separate daughter board. For example, the radar integrated circuit 316 processes a reflected radar signal and generates an intermediate-frequency beat signal. A frequency of the intermediate-frequency beat signal is related to a distance to a portion of the user. The radar integrated circuit 316 provides the intermediate-frequency beat signal to the data-processing integrated circuit 318, which processes the intermediate-frequency beat signal to determine a distance to the user, for instance.

Although not explicitly shown, the radar integrated circuit 316 includes storage memory with a capacity on the order of tens of kilobytes (KB), such as 24 KB. In this example, the storage memory is implemented with a first-in first-out (FIFO) memory structure, although other types of memory structures can be implemented. In contrast, the data-processing integrated circuit 318 includes storage memory with a capacity on the order of megabytes (MB), such as 4 MB. The data-processing integrated circuit 318 also includes a direct-memory access (DMA) controller, which transfers samples of the intermediate-frequency beat signal from the storage memory of the radar integrated circuit 316 to a circular buffer within the data-processing integrated circuit 318.

The data-processing integrated circuit 318 is also positioned near the computer processor 202 to facilitate communication between the data-processing integrated circuit 318 and the computer processor 202. Upon recognizing the gesture, for instance, the data-processing integrated circuit 318 notifies the computer processor 202 of the type of gesture performed by the user.

Figure 8:
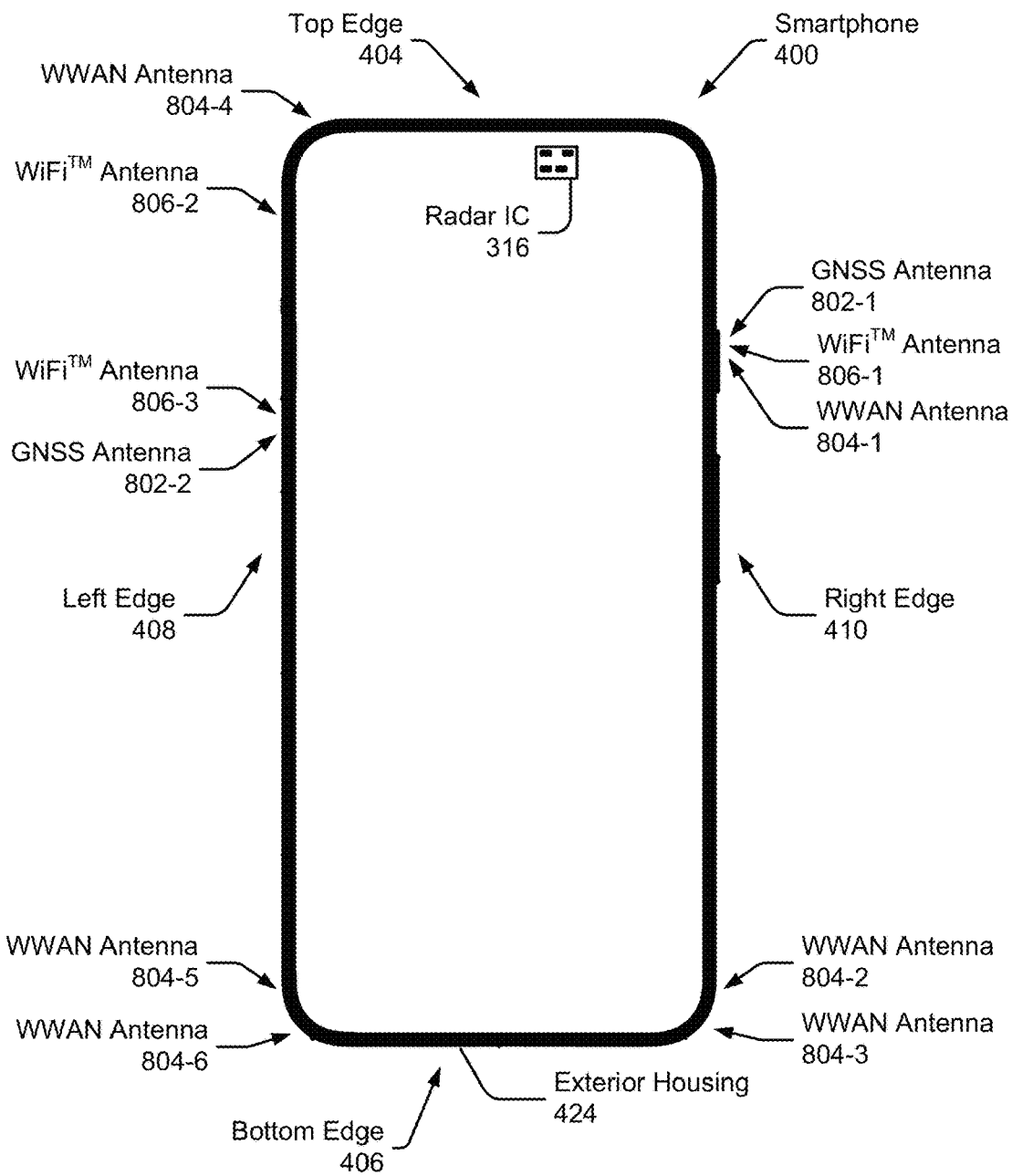
FIG. 8 illustrates an example position of a radar integrated circuit relative to other antennas within a smartphone.

FIG. 8 illustrates an example position of the radar integrated circuit 316 relative to other antennas within the smartphone 400. General positions of the other antennas exist within the interior of the smartphone 400 and are shown relative to the exterior housing 424 of the smartphone 400. In the depicted configuration, the smartphone 400 includes GNSS antennas 802-1 and 802-2, which are implemented as part of the GNSS receiver 216 of FIG. 2. The smartphone 400 also includes wireless wide-area-network (WWAN) antennas 804-1 to 804-6 and WiFi™ antennas 806-1 to 806-3, which are implemented as part of the wireless communication system 220 of FIG. 2. The WWAN antennas 804-1 to 804-6 are coupled to the communication modules 220-2 to 220-8 of FIGS. 7-1 and 7-2, and can be associated with different frequency bands. Similarly, the WiFi™ antennas 806-1 to 806-3 are coupled to the WiFi™ and Bluetooth™ communication module 220-1 of FIG. 7-1.

In general, the antennas are oriented towards the left edge 408 or the right edge 410. Some antennas, however, can be oriented towards a front side of the smartphone 400 (e.g., facing the exterior viewing panel 426) or a back side of the smartphone 400 (e.g., facing an opposite side relative to the exterior viewing panel 426). As an example, the WiFi™ antenna 806-2 faces the back side of the smartphone 400, the WWAN antenna 804-6 faces the front side of the smartphone 400, and the remaining antennas face either the left edge 408 or the right edge 410 of the smartphone 400.

In some cases, spurious emissions from the radar integrated circuit 316 can interfere with operation of the GNSS receiver 216 and reduce the sensitivity and accuracy of the GNSS receiver 216. To reduce the interference, the radar integrated circuit 316 is positioned at least 20 mm away from the GNSS antennas 802-1 and 802-2.

Figure 9:
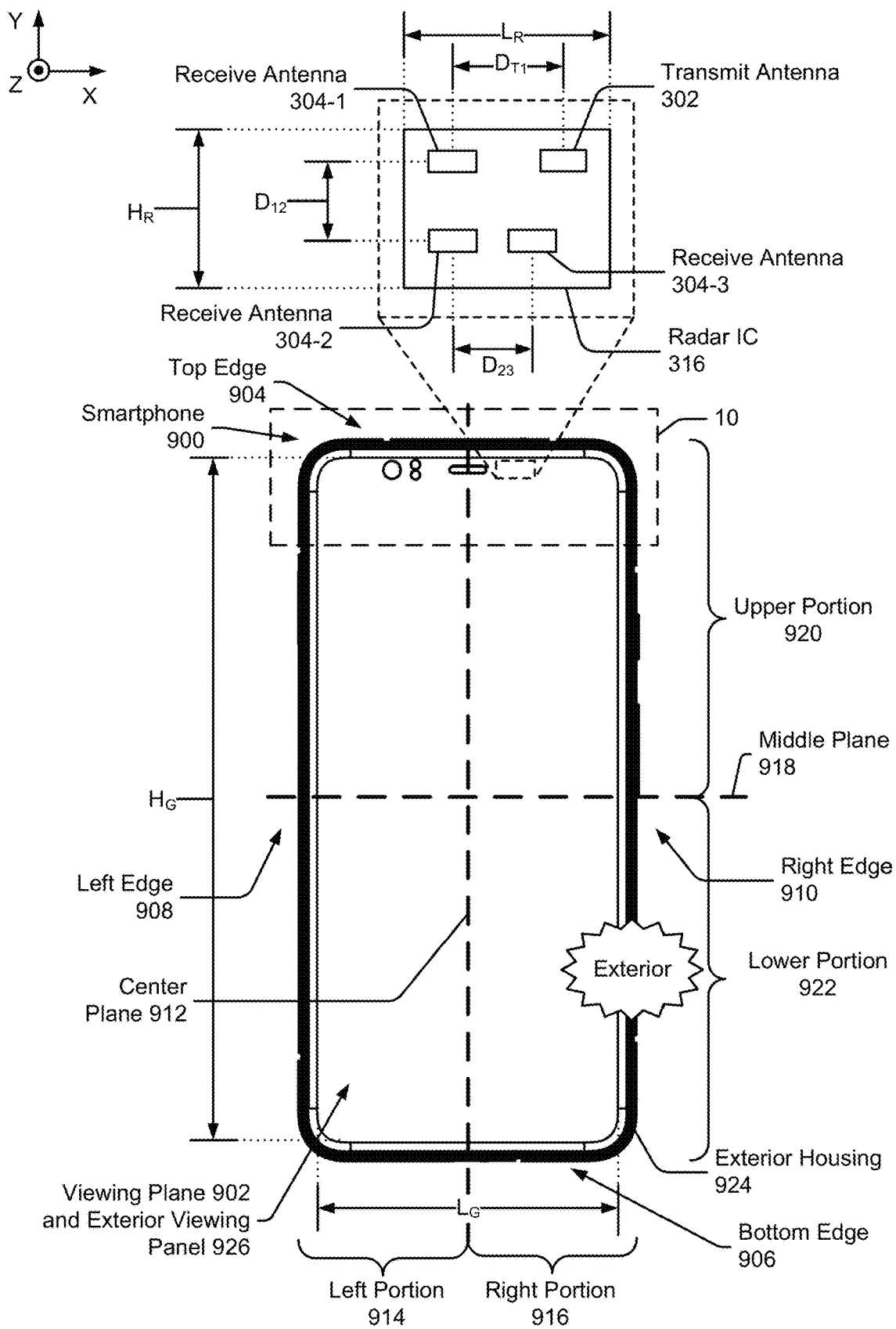
FIG. 9 illustrates another example implementation of a smartphone with an integrated radar system.

FIG. 9 illustrates an example implementation of a smartphone 900 with the integrated radar system 102. The smartphone 900 is shaped as a rectangular prism with a height that is greater than a length and width. Additionally, the length is greater than the width. The smartphone 900 is illustrated in the portrait orientation in which the height is along a vertical Y axis, the length is along a horizontal X axis, and the width is along a Z axis that is perpendicular to X and Y axes. The length and height form a rectangular plane on a first exterior plane of the smartphone 900. The first exterior plane coexists with a viewing plane 902 and has a top edge 904, a bottom edge 906 that is opposite to the top edge, a left edge 908, and a right edge 910 that is opposite the left edge 908.

A center plane 912 centered between the left edge 908 and the right edge 910 bifurcates the first exterior plane and is perpendicular to the top edge 904 and the bottom edge 906. The center plane 912 separates a left portion 914 of the smartphone 900, which is proximate to the left edge 908, from a right portion 916 of the smartphone 900, which is proximate to the right edge 910. A middle plane 918 centered between the top edge 904 and the bottom edge 906 bifurcates the first exterior plane and is perpendicular to the left edge 908 and the right edge 910. The middle plane 918 separates an upper portion 920 of the smartphone 900, which is proximate to the top edge 904, from a lower portion 922 of the smartphone 900, which is proximate to the bottom edge 906.

An exterior of the smartphone 900 includes an exterior housing 924 and an exterior viewing panel 926. The exterior housing 924 has a vertical height of approximately 160 millimeters (mm), a horizontal length of approximately 75 mm, and a width of approximately 8.2 mm. The exterior housing 924 can be composed of metal material, for instance.

The exterior viewing panel 926 forms an exterior face of the smartphone 900 (e.g., the viewing plane 902). The exterior viewing panel 926 has a vertical height ($H_G$) of approximately 152 mm and a horizontal length ($L_G$) of approximately 67 mm. The exterior viewing panel 926 includes cut-outs for various components that are positioned within an interior of the smartphone 900 (e.g., positioned beneath the exterior viewing panel 926). These components are further described with respect to FIG. 10.

The exterior viewing panel 926 can be formed using various types of glass or plastics that are found within display screens. In some implementations, the exterior viewing panel 926 has a dielectric constant (e.g., a relative permittivity) between approximately four and ten, which attenuates or distorts radar signals. As such, the exterior viewing panel 926 is opaque or semi-transparent to a radar signal and can cause a portion of a transmitted or received radar signal to be reflected.

The radar integrated circuit 316 is also positioned beneath the exterior viewing panel 926 and near the top edge 904 (e.g., within the upper portion 920 of the smartphone 900). The radar integrated circuit 316 has a vertical height ($H_R$) of approximately 5 mm, a horizontal length ($L_R$) of approximately 6.5 mm, and a thickness of approximately 0.85 mm (within +/−0.1 mm along each dimension). This limited footprint enables the radar integrated circuit 316 to fit between the speaker 210 and an infrared sensor 214-3 illustrated in FIG. 10. Additionally, the radar integrated circuit 316 fits between the exterior housing 924 and a display element 1002 illustrated in FIG. 10. The vertical height of the radar integrated circuit 316 can be similar to the other components positioned near the top edge 904 to avoid reducing a size of the display element 1002.

In this example implementation, the radar integrated circuit 316 includes one transmit antenna 302 and three receive antennas 304-1 to 304-3. The three receive antennas 304-1 to 304-3 are positioned in an L-arrangement, with a vertical distance between a center of the first receive antenna 304-1 and the second receive antenna 304-2 ($D_{12}$) being approximately 2.5 mm and a horizontal distance between a center of the second receive antenna 304-2 and a center of the third receive antenna 304-3 ($D_{23}$) being approximately 2.5 mm A distance between a center of the transmit antenna 302 and the center of the first receive antenna 304-1 ($D_{T1}$) is approximately 3.5 mm. In general, the transmit antenna 302 is offset relative to the third receive antenna 304-3 such that $D_{T1}$ is greater than $D_{23}$.

The transmit antenna 302 and the receive antennas 304-1 to 304-3 are oriented towards (e.g., face) the exterior viewing panel 926. As such, the radar integrated circuit 316 radiates through the exterior viewing panel 926 (e.g., transmits and receives the radar signals that propagate through the exterior viewing panel 926). If the exterior viewing panel 926 behaves as an attenuator, as described above, the radar system 102 can adjust a frequency or a steering angle of a transmitted radar signal to mitigate the effects of the attenuator instead of increasing transmit power. As such, the radar system 102 can realize enhanced accuracy and longer ranges for detecting and tracking the user without increasing power consumption.

In this example, the radar integrated circuit 316 transmits and receives radar signals with frequencies between approximately 57 and 64 GHz. This mitigates interference with the wireless communication system 220, which uses frequencies below 20 GHz, for instance. Transmitting and receiving radar signals with millimeter wavelengths further enables the radar integrated circuit 316 to realize the above footprint.

To facilitate gesture recognition, the radar integrated circuit 316 is positioned closer to the center plane 912 relative to the left edge 908 or the right edge 910. This improves visibility of the radar integrated circuit 316 for detecting gestures performed by the user. It also reduces a probability that the user accidentally interacts with the radar system 102 with non-gesture related motions, thereby reducing a false-alarm rate of the radar system 102. Furthermore, because the radar integrated circuit 316 is not visible to the user from behind the exterior viewing panel 926, the user is likely to perform gestures relative to the center plane 912. By positioning the radar integrated circuit 316 near the user's reference point, the radar system 102 is better positioned to distinguish between gestures associated with different directions (e.g., distinguish between a left swipe and a right swipe). There are several other advantages and trade-offs for positioning the radar integrated circuit 316 at the illustrated location, as further described below with respect to FIGS. 10-13.

Figure 10:
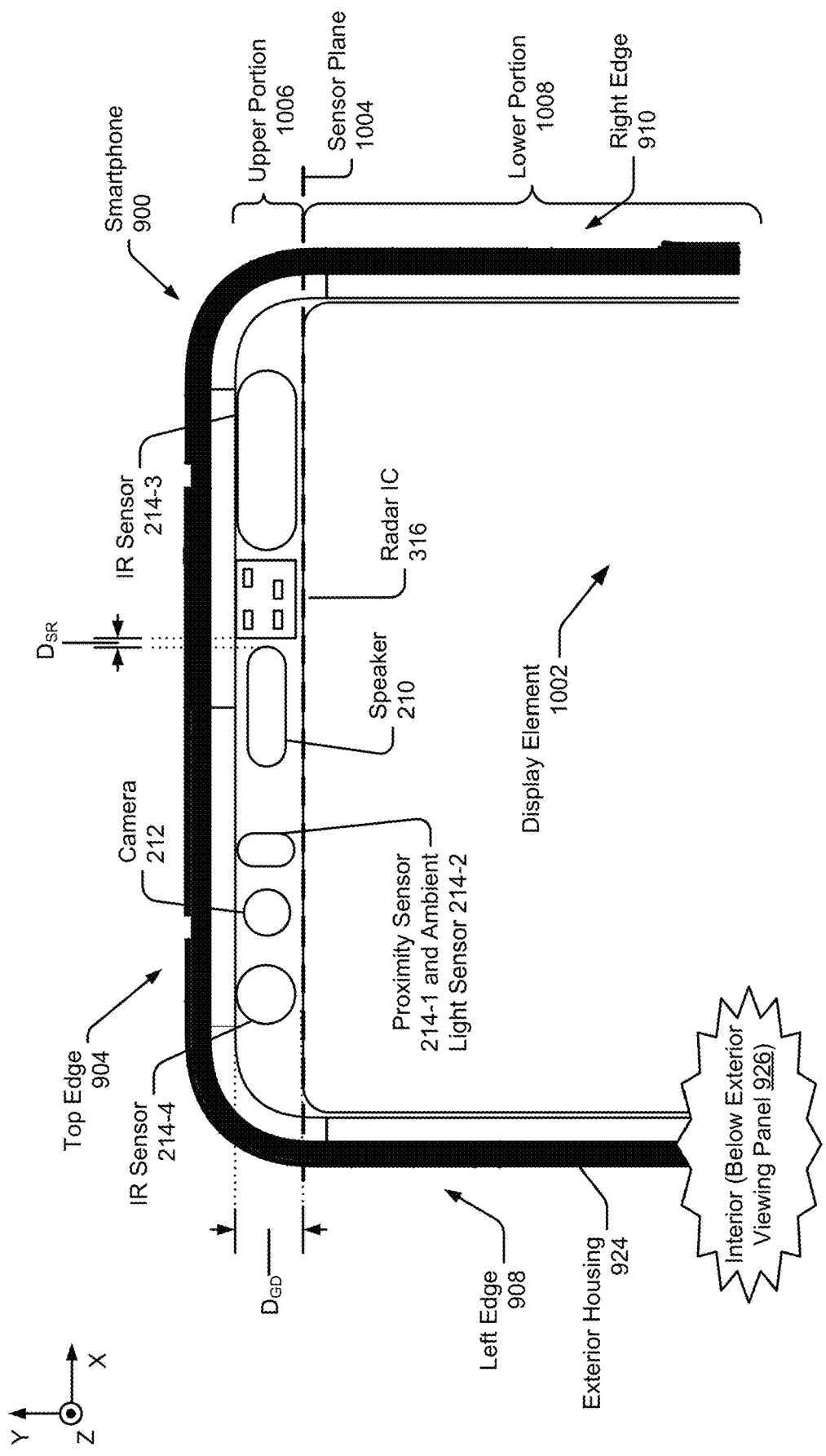
FIG. 10 illustrates another example position of a radar integrated circuit relative to other components within an upper portion of a smartphone.

FIG. 10 illustrates an example position of the radar integrated circuit 316 relative to other components within the upper portion 920 of the smartphone 900. A depicted interior of the smartphone 900 includes the radar integrated circuit 316, the speaker 210, the camera 212, a proximity sensor 214-1, an ambient light sensor 214-2, an infrared sensor 214-3, another infrared sensor 214-4, and a display element 1002.

A sensor plane 1004 intersects the exterior viewing panel 926 of FIG. 9 and is perpendicular to the left edge 908 and the right edge 910. The sensor plane 1004 separates an upper portion 1006 of the exterior viewing panel 926, which is proximate to the top edge 904, from a lower portion 1008 of the exterior viewing panel 926, which is proximate to the bottom edge 906 of FIG. 9. The sensor plane 1004 is parallel to the top edge 904 and is closer to the top edge 904 than the bottom edge 906. In this example, a distance between a top edge of the display element 1002 and a top edge of the exterior viewing panel 926 ($D_{GD}$) is approximately 5.7 mm.

The radar integrated circuit 316, the speaker 210, the camera 212, the proximity sensor 214-1, the ambient light sensor 214-2 and the infrared sensor 214-3 are positioned beneath the upper portion 1006 of the exterior viewing panel 926. The display element 1002 is positioned beneath the lower portion 1008 of the exterior viewing panel 926.

The infrared sensors 214-3 and 214-4 are used for facial recognition. To conserve power, the infrared sensors 214-3 and 214-4 operate in an off-state when not in use. However, a warm-up sequence associated with transitioning the infrared sensors 214-3 and 214-4 from the off-state to an on-state can require a significant amount of time, such as a half second or more. This can cause a delay in execution of the facial recognition. To reduce this time delay, the radar system 102 proactively detects the user reaching towards or approaching the smartphone 900 and initiates the warm-up sequence prior to the user touching the smartphone 900. As such, the infrared sensors 214-3 and 214-4 can be in the on-state sooner and reduce a time the user waits for the facial recognition to complete.

The display element 1002 implements the display 208 of FIG. 2 and displays images that are viewed through the exterior viewing panel 926. As shown, the transmit antenna 302 and the receive antennas 304-1 to 304-3 of the radar integrated circuit 316 are oriented towards (e.g., face) a same direction as the display element 1002 such that the radar integrated circuit 316 transmits radar signals towards a user that is looking at the display 208.

In this example, the radar integrated circuit 316 is positioned between the infrared sensor 214-3 and the speaker 210. One trade-off for placing the radar integrated circuit 316 near the center plane 912 is placing the radar integrated circuit 316 near the speaker 210. A distance between the radar integrated circuit 316 and the speaker 210 ($D_{SR}$) is approximately 0.85 mm or less, for instance. To reduce an impact of mechanical vibrations from the speaker 210, the radar integrated circuit 316 is mechanically isolated from the speaker 210. If the smartphone 900 includes another speaker within the lower portion 922 of the smartphone 900, a bass speaker can be integrated within the other speaker instead of the speaker 210 in order to place the bass speaker farther away from the radar integrated circuit 316.

Figure 11:
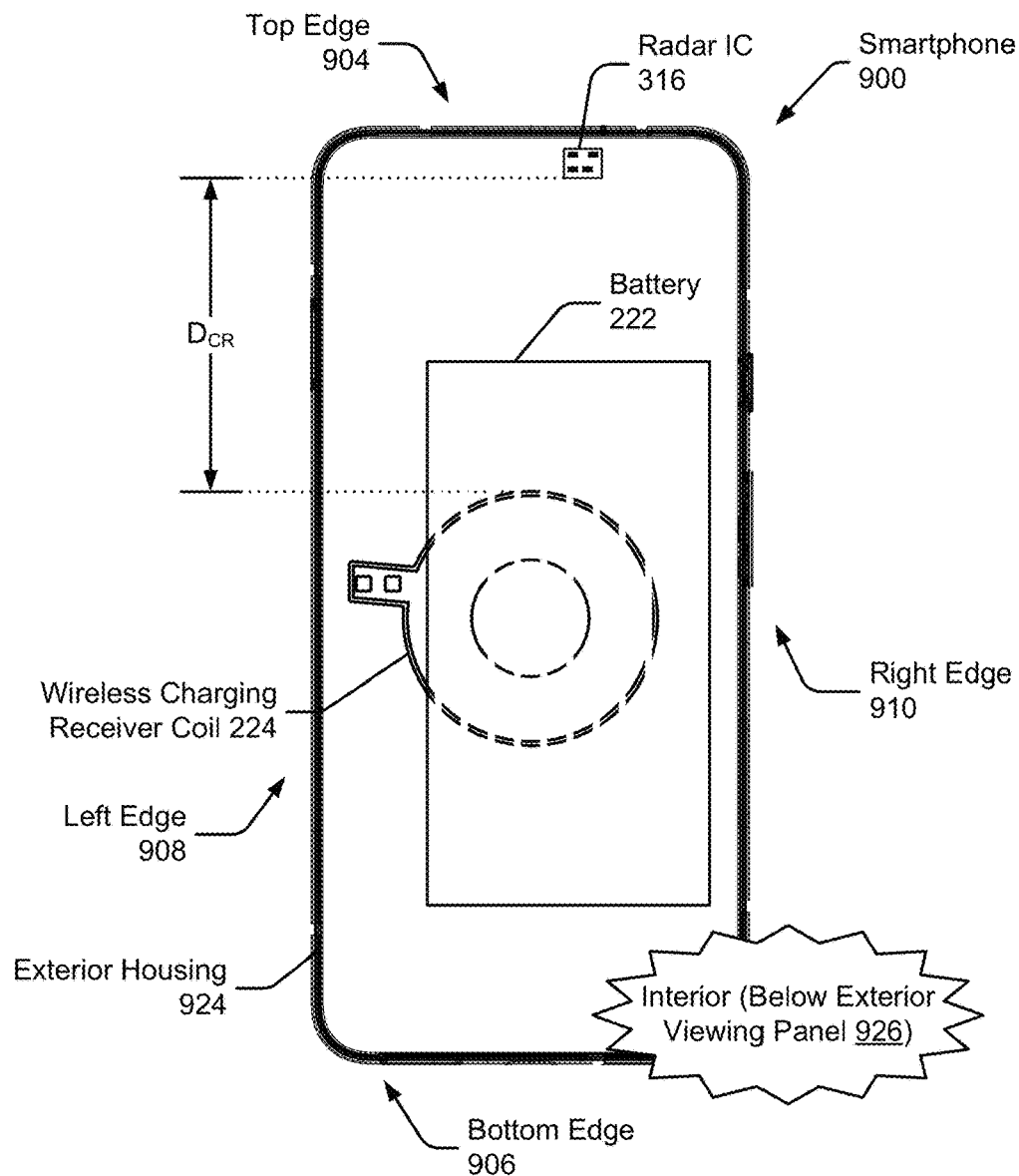
FIG. 11 illustrates another example position of a radar integrated circuit relative to components of a power system within a smartphone.

FIG. 11 illustrates an example position of the radar integrated circuit 316 relative to components of the power system 218 within the smartphone 900. In the depicted configuration, the power system 218 includes the battery 222 and the wireless charging receiver coil 224 of FIG. 2. The wireless charging receiver coil 224 is positioned below the battery 222 (e.g., the battery 222 is between the wireless charging receiver coil 224 and the exterior viewing panel 926 along the Z axis).

In some implementations, frequencies used to wirelessly transfer power for wireless charging are also used for radar operations. As an example, the radar integrated circuit 316 generates an intermediate-frequency beat signal with frequencies between approximately 30 and 500 kilohertz (kHz) and the frequency of a wireless charging signal is between approximately 110 and 150 kHz. To mitigate the interference generated during wireless charging, the radar integrated circuit 316 is positioned at a distance ($D_{CR}$) of at least 54 mm away from the wireless charging receiver coil 224. This reduces the AC coupling and interference experienced by the radar system 102, thereby improving the sensitivity and the accuracy of the radar system 102. In some implementations, a magnetic shield is placed between the wireless charging receiver coil 224 and the battery 222 (e.g., between the wireless charging receiver coil 224 and the radar integrated circuit 316). The magnetic shield is implemented as a nanocrystalline shield, for instance.

Figures 1, 12:
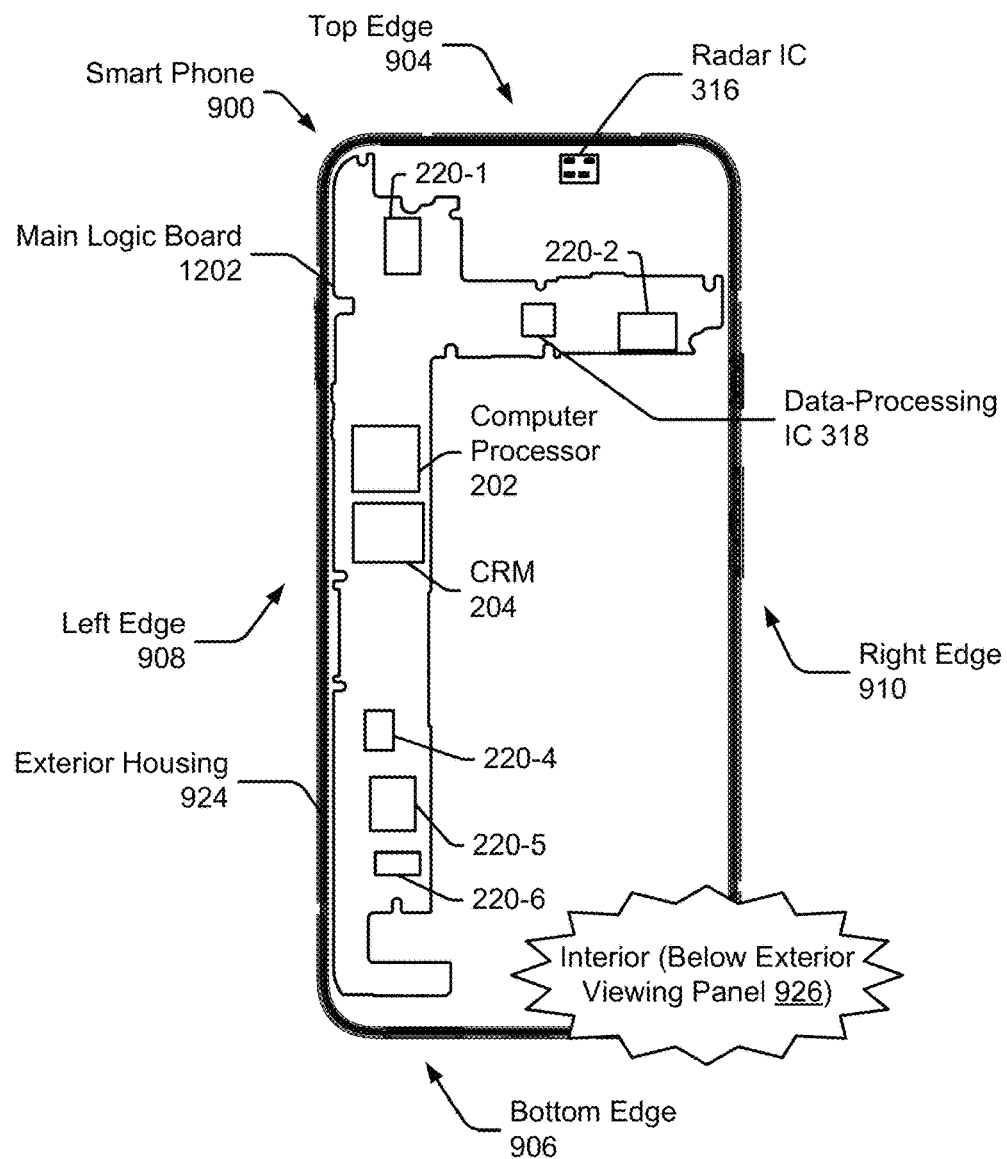
Figures 2, 12:
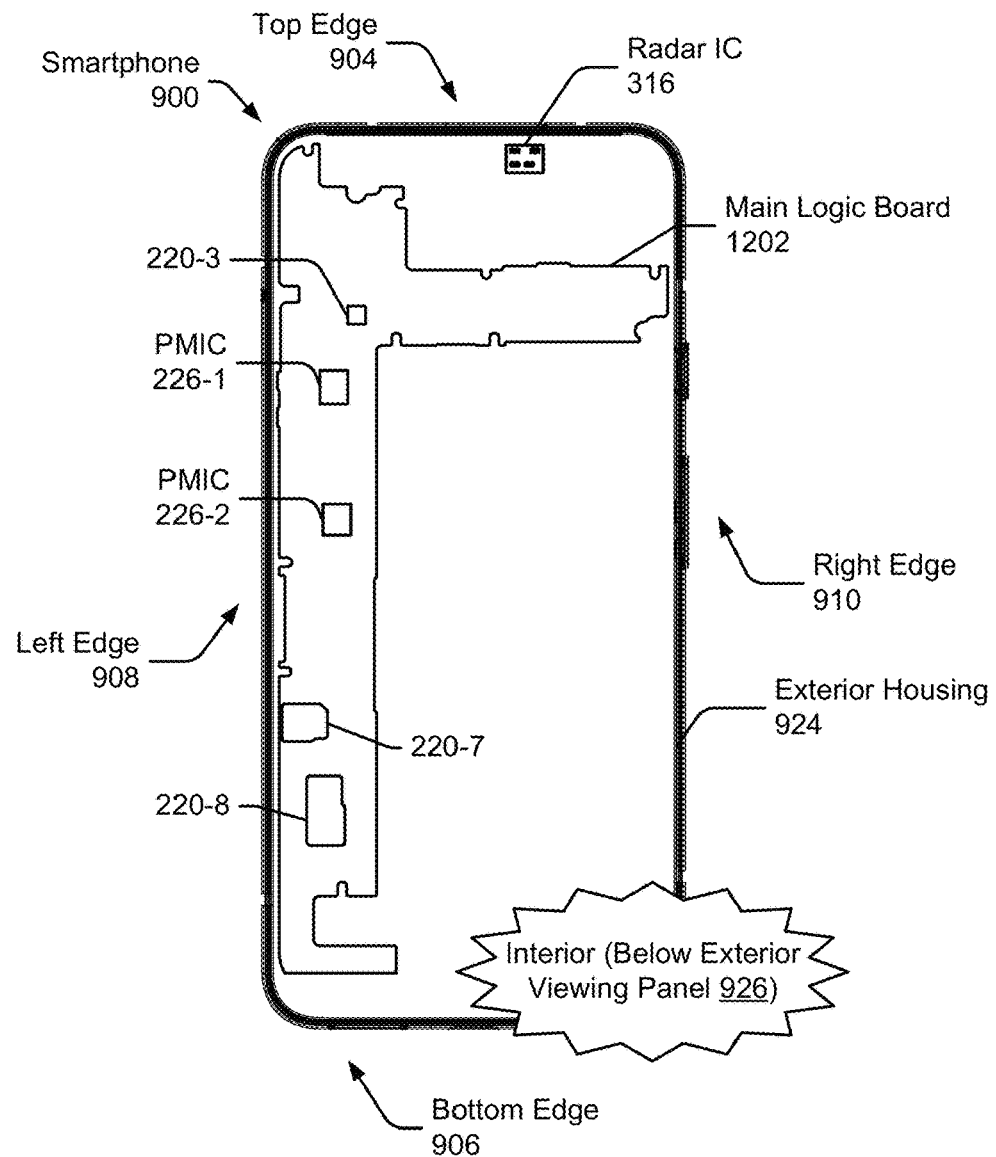

FIGS. 12-1 and 12-2 illustrate an example position of the radar integrated circuit 316 relative to components within a main logic board 1202 of the smartphone 900. In the depicted configuration, components that are implemented on a top face of the main logic board 1202 are illustrated in FIG. 12-1. These components are oriented towards or face the exterior viewing panel 926. Other components that are implemented on a bottom face of the main logic board 1202 are illustrated in FIG. 12-2. These components are oriented away from the exterior viewing panel 926 and face a backside of the smartphone 900 that is opposite the exterior viewing panel 926. The main logic board 1202 includes the computer processor 202, the computer-readable media 204, and the data-processing integrated circuit 318 of the radar system 102. The main logic board 1202 also includes PMICs 226-1 and 226-2, which provide power to the radar integrated circuit 316 and the main logic board 1202. The two-PMIC design can realize improvements in heat dissipation and efficiency relative to a single-PMIC design.

The main logic board 1202 additionally includes modules 220-1 to 220-8 of the wireless communication system 220. These modules include a WiFi™ and Bluetooth™ transceiver module 220-1, cellular transceiver modules 220-2, 220-7, and 220-8, a near-field communication (NFC) module 220-3, plain-text receive (PTRX) modules 220-5 and 220-6, and other types of components not shown, such as power amplifier modules. In this example, the GNSS receiver 216 is also implemented within the WiFi™ and Bluetooth™ transceiver module 220-1. The cellular transceiver modules 220-2, 220-7, and 220-8 and the plain-text receive modules 220-4 and 220-6 are associated with a low band, a mid-high band, a high band, or an ultra-high band, or combinations thereof.

The data-processing integrated circuit 318 is positioned within the upper portion 920 to facilitate communication with the radar integrated circuit 316, which is implemented on a separate daughter board. For example, the radar integrated circuit 316 processes a reflected radar signal and generates an intermediate-frequency beat signal. A frequency of the intermediate-frequency beat signal is related to a distance to a portion of the user. The radar integrated circuit 316 provides the intermediate-frequency beat signal to the data-processing integrated circuit 318, which processes the intermediate-frequency beat signal to determine a distance to the user, for instance.

Although not explicitly shown, the radar integrated circuit 316 includes storage memory with a capacity on the order of tens of kilobytes (KB), such as 24 KB. In this example, the storage memory is implemented with a first-in first-out (FIFO) memory structure, although other types of memory structures can be implemented. In contrast, the data-processing integrated circuit 318 includes storage memory with a capacity on the order of megabytes (MB), such as 4 MB. The data-processing integrated circuit 318 also includes a direct-memory access (DMA) controller, which transfers samples of the intermediate-frequency beat signal from the storage memory of the radar integrated circuit 316 to a circular buffer within the data-processing integrated circuit 318.

The data-processing integrated circuit 318 is also positioned near the computer processor 202 to facilitate communication between the data-processing integrated circuit 318 and the computer processor 202. Upon recognizing the gesture, for instance, the data-processing integrated circuit 318 notifies the computer processor 202 of the type of gesture performed by the user.

Figure 13:
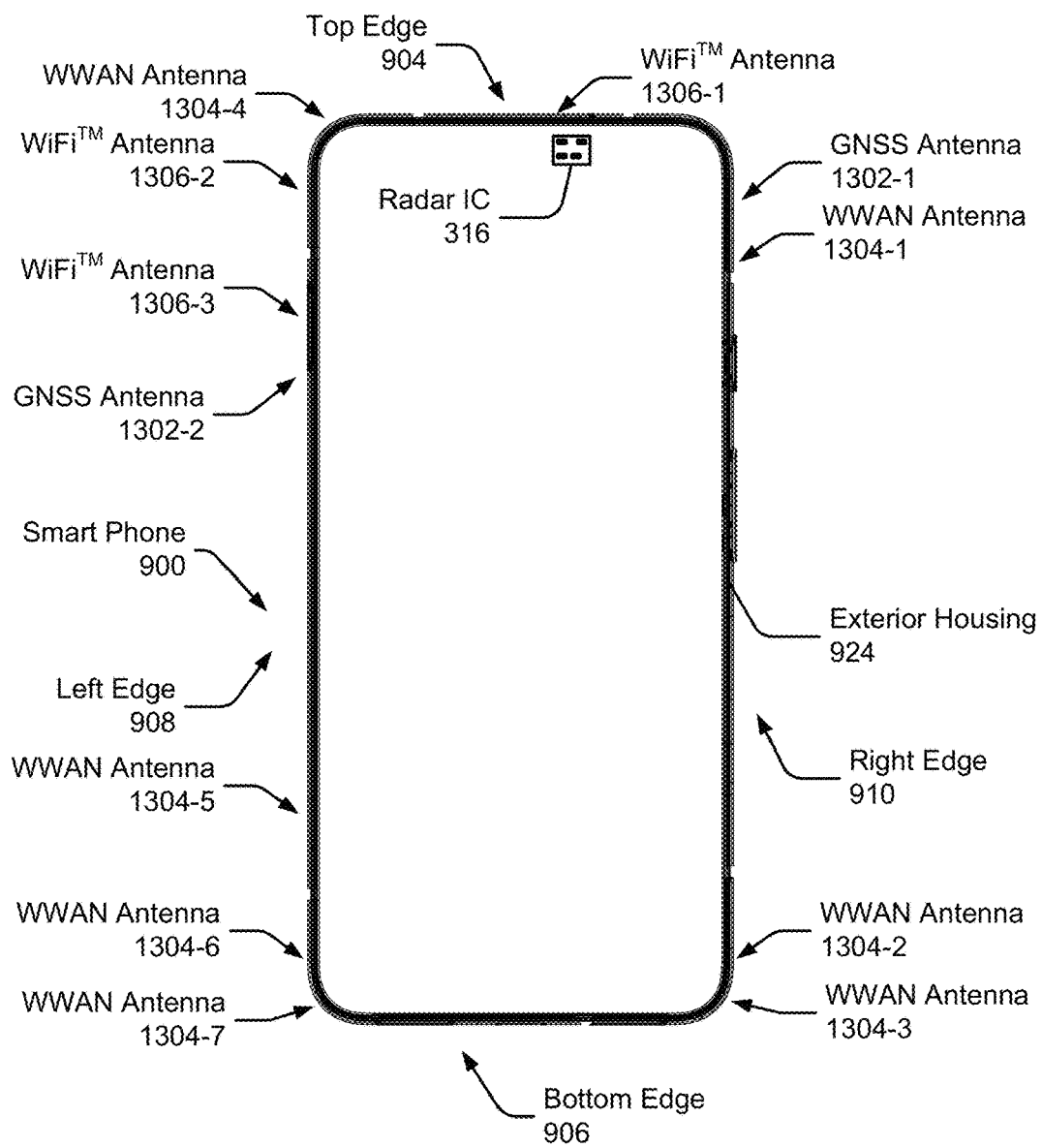
FIG. 13 illustrates another example position of a radar integrated circuit relative to other antennas within a smartphone.

FIG. 13 illustrates an example position of the radar integrated circuit 316 relative to other antennas within the smartphone 900. General positions of the other antennas exist within the interior of the smartphone 900 and are shown relative to the exterior housing 922 of the smartphone 900. In the depicted configuration, the smartphone 900 includes GNSS antennas 1302-1 and 1302-2, which are implemented as part of the GNSS receiver 216 of FIG. 2. The smartphone 900 also includes wireless wide-area-network (WWAN) antennas 1304-1 to 1304-7 and WiFi™ antennas 1306-1 to 1306-3, which are implemented as part of the wireless communication system 220 of FIG. 2. The WWAN antennas 1304-1 to 1304-7 are coupled to the communication modules 220-2 to 220-8 of FIG. 12, and can be associated with different frequency bands. Similarly, the WiFi™ antennas 1306-1 to 1306-3 are coupled to the WiFi™ and Bluetooth™ communication module 220-1.

In general, the antennas are oriented towards the left edge 908 or the right edge 910. Some antennas, however, can be oriented towards a front side of the smartphone 900 (e.g., facing the exterior viewing panel 926) or a back side of the smartphone 900 (e.g., facing an opposite side relative to the exterior viewing panel 926). As an example, the WiFi™ antenna 1306-2 faces the back side of the smartphone 900, the WWAN antenna 1304-7 faces the front side of the smartphone 900, and the remaining antennas face either the left side or the right side of the smartphone 900.

In some cases, spurious emissions from the radar integrated circuit 316 can interfere with operation of the GNSS receiver 216 and reduce the sensitivity and accuracy of the GNSS receiver 216. To reduce the interference, the radar integrated circuit 316 is positioned at least 20 mm away from the GNSS antennas 1302-1 and 1302-2.

CONCLUSION

Although techniques using, and apparatuses including, a smart device with an integrated radar system have been described in language specific to features, it is to be understood that the subject of the appended claims is not necessarily limited to the specific features. Rather, the specific features are disclosed as example implementations of a smart device with an integrated radar system.

The invention claimed is:

1. A smartphone comprising:
a radar system comprising:
  a radar integrated circuit comprising:
    a transceiver configured to:
      receive a radar signal, at least a portion of the radar signal having a frequency of sixty gigahertz; and
      generate an intermediate-frequency beat signal based on the radar signal; and
    a first storage memory; and
  a data-processing integrated circuit coupled to the radar integrated circuit, the data-processing integrated circuit comprising:
    a circular buffer; and
    a direct-memory access controller configured to transfer samples of the intermediate-frequency beat signal from the first memory of the radar integrated circuit to the circular buffer of the data-processing integrated circuit.

2. The smartphone of claim 1, wherein:
the smartphone is shaped as a rectangular prism, the rectangular prism having a length, width, and height, the height being greater than the length and width, the length being greater than the width, the length and height forming a rectangular plane on a first exterior plane of the smartphone coexisting with a viewing plane of the smartphone, the first exterior plane having:
  a top edge and a bottom edge opposite the top edge; and
  a left edge and a right edge opposite the left edge, a center plane centered between the left edge and the right edge bifurcates the first exterior plane, the center plane being perpendicular to the top edge and the bottom edge;
the smartphone is configured to operate in a portrait orientation in which a ground plane is closer to the bottom edge than the top edge,
the radar system is positioned inside the rectangular prism; and
the radar integrated circuit comprises:
  at least one transmit antenna coupled to the transceiver;
  at least one receive antenna coupled to the transceiver; and
  a center, the center of the radar integrated circuit located closer to the center plane than the left edge or the right edge, the center of the radar integrated circuit located closer to the top edge than the bottom edge.

3. The smartphone of claim 2, wherein:
the smartphone comprises:
  an exterior viewing panel that forms the viewing plane, the exterior viewing panel composed of glass and having a lower portion proximate to the bottom edge and an upper portion proximate to the top edge, the lower portion and the upper portion separated by a sensor plane that is perpendicular to the left edge and the right edge; and
  a display element positioned inside the rectangular prism beneath the lower portion of the exterior viewing panel, the display element parallel to the exterior viewing panel; and
the radar integrated circuit is positioned beneath the upper portion of the exterior viewing panel such that the at least one transmit antenna and the at least one receive antenna face the exterior viewing panel, the radar integrated circuit parallel to the viewing panel.

4. The smartphone of claim 3, wherein:
the upper portion of the exterior viewing panel has a height of approximately 6.5 millimeters; and
the radar integrated circuit has a length of approximately 6.5 millimeters, a height of approximately 5 millimeters, and a thickness of approximately 0.85 millimeters.

5. The smartphone of claim 3, wherein:
the transceiver is configured to:
  transmit the radar signal through the exterior viewing panel using the at least one transmit antenna; and
  receive a reflected portion of the radar signal through the exterior viewing panel using the at least one receive antenna, the radar signal reflected by at least one user; and
the data-processing integrated circuit comprises a digital signal processor configured to process the samples of the intermediate-frequency beat signal to determine a distance between the smartphone and the at least one user.

6. The smartphone of claim 5, wherein:
the smartphone comprises at least one infrared sensor; and
the digital signal processor is configured to:
process the samples of the intermediate-frequency beat signal to determine that the at least one user is approaching the smartphone; and
cause the at least one infrared sensor to initiate a warm-up sequence prior to the user touching the smartphone, the warm-up sequence causing the at least one infrared sensor to transition from an off-state to an on-state.

7. The smartphone of claim 1, further comprising:
a wireless charging receiver coil,
wherein the center of the radar integrated circuit is positioned at least 40 millimeters away from the wireless charging receiver coil.

8. The smartphone of claim 7, further comprising:
a magnetic shield,
wherein the magnetic shield is positioned between the wireless charging receiver coil and the radar integrated circuit.

9. The smartphone of claim 1, further comprising:
a first speaker,
wherein a distance between the first speaker and the radar integrated circuit is less than 1 millimeter.

10. The smartphone of claim 9, wherein:
the radar integrated circuit is mechanically isolated from the first speaker to dampen mechanical vibrations that are generated by the first speaker.

11. The smartphone of claim 9, further comprising:
a second speaker, the second speaker comprising a bass speaker,
wherein the radar integrated circuit is closer to the first speaker than the second speaker.

12. The smartphone of claim 1, further comprising:
a camera,
wherein the radar system consumes less power than the camera.

13. The smartphone of claim 1, further comprising:
a global navigation satellite system (GNSS) receiver comprising at least one GNSS antenna,
wherein a distance between the radar integrated circuit and the at least one GNSS antenna is at least 20 millimeters.

14. The smartphone of claim 1, wherein:
the first storage memory of the radar integrated circuit has a first size; and
the data-processing integrated circuit has a second storage memory that is at least one hundred times larger than the first size.

15. The smartphone of claim 14, wherein the first size is on the order of tens of kilobytes.

16. The smartphone of claim 1, further comprising a computer processor, wherein:
the data-processing integrated circuit is configured to:
detect a gesture performed by a user based on the samples of the intermediate-frequency beat signal; and
inform the computer processor of the gesture.

17. A smartphone shaped as a rectangular prism, the rectangular prism having a length, width, and height, the height being larger than the length and width, the length being greater than the width, the length and height forming a rectangular plane on a first exterior plane of the smartphone coexisting with a viewing plane of the smartphone, the first exterior plane having:
a top edge and a bottom edge opposite the top edge; and
a left edge and a right edge opposite the left edge,
the smartphone comprising an exterior viewing panel that forms the viewing plane, the exterior viewing panel having an upper portion that is proximate to the top edge and a lower portion that is proximate to the bottom edge, the upper portion and the lower portion separated by a sensor plane that is perpendicular to the left edge and the right edge;
the smartphone configured to operate in a portrait orientation in which a ground plane is closer to the bottom edge than the top edge, the smartphone comprising:
a display element positioned inside the rectangular prism beneath the lower portion of the exterior viewing panel; and
a radar system positioned inside the rectangular prism beneath the upper portion of the exterior viewing panel, the radar system comprising a radar integrated circuit having a length of approximately 6.5 millimeters and a height of approximately 5 millimeters, the radar integrated circuit comprising:
at least one transmit antenna that faces the exterior viewing panel; and
at least one receive antenna that faces the exterior viewing panel.

18. The smartphone of claim 17, wherein:
a center plane centered between the left edge and the right edge bifurcates the first exterior plane, the center plane perpendicular to the top edge and the bottom edge; and
the radar integrated circuit comprising a center that is located closer to the center plane than the left edge or the right edge, the center of the radar integrated circuit located closer to the top edge than the bottom edge.

19. The smartphone of claim 17, wherein:
a middle plane centered between the top edge and the bottom edge bifurcates the first exterior plane, the middle plane perpendicular to the left edge and the right edge; and
the sensor plane is parallel to the middle plane and is closer to the top edge than the middle plane.

20. The smartphone of claim 17, wherein the radar integrated circuit has a thickness of approximately 0.85 millimeters.

* * * * *